US008288008B2

(12) United States Patent
Goto et al.

(10) Patent No.: US 8,288,008 B2
(45) Date of Patent: Oct. 16, 2012

(54) IMAGE RECORDING MATERIAL, METHOD FOR PRODUCING THE SAME, AND IMAGE FORMING METHOD

(75) Inventors: Yasutomo Goto, Shizuoka (JP); Ashita Murai, Kanagawa (JP); Shinji Fujimoto, Shizuoka (JP); Yoshio Tani, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1359 days.

(21) Appl. No.: 11/857,687

(22) Filed: Sep. 19, 2007

(65) Prior Publication Data

US 2008/0081274 A1 Apr. 3, 2008

(30) Foreign Application Priority Data

Sep. 28, 2006 (JP) ................................ 2006-264468

(51) Int. Cl.
*B32B 27/06* (2006.01)
*G03G 13/14* (2006.01)

(52) U.S. Cl. ................ 428/480; 428/411.1; 430/124.54

(58) Field of Classification Search ............ 430/124.13, 430/124.54; 428/411.1, 480
See application file for complete search history.

(56) References Cited

U.S. PATENT DOCUMENTS

| | | | | |
|---|---|---|---|---|
| 2005/0136261 | A1* | 6/2005 | Tani | 428/411.1 |
| 2006/0046043 | A1* | 3/2006 | Tani | 428/292.1 |
| 2006/0198970 | A1* | 9/2006 | Tamagawa | 428/32.22 |
| 2008/0057419 | A1* | 3/2008 | Fujimoto et al. | 430/32 |

FOREIGN PATENT DOCUMENTS

| | | | |
|---|---|---|---|
| JP | 2005-099123 | A | 4/2005 |
| JP | 2005-092097 | A | 7/2005 |
| JP | 2005-181881 | A | 7/2005 |
| JP | 2005-181883 | A | 9/2007 |

* cited by examiner

*Primary Examiner* — Christopher Rodee
(74) *Attorney, Agent, or Firm* — Sughrue Mion, PLLC

(57) ABSTRACT

An image recording material which has a support and an image recording layer containing a crystalline polymer and an amorphous polymer on at least one surface of the support, wherein the image recording layer has a storage elastic modulus G' at 100° C. of $1\times10^2$ Pa to $1\times10^5$ Pa during a temperature increase at 5° C./min, a storage elastic modulus G' at 60° C. of $1\times10^6$ Pa or more during a temperature decrease at 5° C./min and a temperature difference of 18° C. or less between a temperature at which the storage elastic modulus G' during a temperature increase at 5° C./min reaches $1\times10^5$ Pa and a temperature at which the storage elastic modules G' during a temperature decrease at 5° C./min reaches $1\times10^5$ Pa, upon measurement of viscoelasticity by using a rheometer of plate-to-plate distance: 1.5 mm, diameter: 20 mm.

8 Claims, 5 Drawing Sheets

IMAGE RECORDING MATERIAL, METHOD FOR PRODUCING THE SAME, AND IMAGE FORMING METHOD

BACKGROUND OF THE INVENTION

1. Field of the Invention

The present invention relates to an image recording material which is appropriate as an image receiving sheet for electrophotography, a method for producing an image recording material and an image forming method using the image recording material.

2. Description of the Related Art

Since electrophotography, which is a dry processing, is excellent in printing speed and able to output an image on general-use paper such as plain paper and fine paper, it has found a wide application in copiers and output devices used in personal computers. In general, image receiving sheets for electrophotography used in the above-described electrophotography have at least a toner image receiving layer on a support, and the toner image receiving layer is formed, for example, by a method in which a thermoplastic-resin containing composition is melted and extruded on the support to have a lamination, a method in which a thermoplastic-resin containing coating solution is coated on the support or others.

Thermoplastic resins used in the toner image receiving layer usually include amorphous polymers, the glass transition temperature (Tg) of which is higher than an environmental temperature and in a temperature range lower by several dozen degrees than a toner fixable temperature. These amorphous polymers are excellent in adhesiveness to toner but are also high in adhesive force between toner image receiving layers containing the toner. Thus, there is found a problem that during storage and transportation of image receiving sheets for electrophotography containing the toner image receiving layer which are superimposed, the toner image receiving layers adhere to each other to result in adhesion failure.

On the other hand, crystalline polymers are low in adhesive force even where the glass transition temperature (Tg) is in a temperature range of below-zero to be free from adhesion failure between the toner image receiving layers containing the crystalline polymer. However, there is a problem that they are deficient in adhesiveness to toner, thereby resulting in removal of toner from the toner image receiving layer after the toner is fixed.

In order to solve the problem, there has been proposed an image receiving sheet for electrophotography in which, for example, a toner image receiving layer contains a mixture of a linear amorphous polymer with a linear crystalline polymer, a glass transition temperature (Tg1(° C.)) of the linear amorphous polymer is 40° C. to 120° C. and a melting point (Tm (° C.)) of the linear crystalline polymer is 100° C. to 200° C. (refer to Japanese Patent Application Laid-Open (JP-A) No. 2005-181881).

Further, there has been proposed an image receiving sheet for electrophotography in which a toner image receiving layer contains a mixture of a linear amorphous polymer with a linear crystalline polymer, and a glass transition temperature (Tg1) of the linear amorphous polymer and a melting point (Tm) of the linear crystalline polymer satisfy the relationship of the following formula $(Tg1-20°\ C.) \leqq Tm \leqq (Tg1+20°\ C.)$ and also the Tg1 is in a range from 40° C. to 120° C. (refer to JP-A No. 2005-181883).

According to these proposals, it is possible to improve the respective problems of amorphous polymers and crystalline polymers, achieve both favorable toner fixing property and excellent adhesion resistance and also form a highly glossy and high-quality image.

However, in these proposals, a solution prepared by dissolving a mixture of a linear amorphous polymer with a linear crystalline polymer in an organic solvent is used as a coating solution for a toner image receiving layer, thereby causing a serious impact to the environment. Further, in the above proposals, a highly glossy image is obtained where a fixing temperature is high, for example, approximately 155° C. However, on a decrease in fixing temperature, there are found defects such as a decreased gloss and variance in gloss level on a border line between an image portion and a non-image portion. Therefore, when the fixing temperature is decreased for the purpose of saving energy, a problem is posed that only an unpleasant image is obtained which is inferior in uniformity.

In order to obtain a highly glossy and high-quality image, it is necessary that an image receiving sheet should be easily peeled off from a heating roller or a fixing belt and, for this reason, no viscosity should develop on peeling during the course of a temperature decrease (viscoelasticity values). However, no consideration has been so far made for these matters.

There has also been proposed a body to be transferred for a color electrophotographic image having a toner receiving layer formed with a crystalline polyester resin in which an aromatic dicarboxylic acid component is contained as an acid-derived component and straight-chain aliphatic diol, bisphenol S, or bisphenol S alkylene oxide additive is contained as an alcohol derived component (refer to JP-A No. 2005-92097).

Further, there has been proposed an image support material in which a thermoplastic resin of a toner receiving layer is made of a polyester resin prepared by melting and mixing a crystalline polyester resin and an amorphous polyester resin and a viscosity of $10^3$ Pa·s is obtained at temperatures from 80° C. to 110° C. (refer to JP-A No. 2005-99123).

However, in these proposals, there is found a problem that the toner receiving layer is not formed by a coating method but is formed by a melt extrusion method, which requires expensive production facilities and an increased quantity of energy to result in an increased production cost, a greater impact on the environment and a poor quality of the gloss.

Under these circumstances, there is not yet been provided an image recording material having excellent low temperature fixing property and excellent adhesion resistance which is excellent in peeling property from a fixing device, capable of forming a highly glossy and high-quality image and preferable as an image receiving sheet for electrophotography in particular, an effective method for producing the image recording material, or a method for forming an image favorable in fixing-device passing performance by using the image recording material.

BRIEF SUMMARY OF THE INVENTION

The object of the present invention is to provide an image recording material which can exhibit excellent low temperature fixing property and excellent adhesion resistance, is excellent in peeling property from a fixing device, capable of forming a highly glossy and high-quality image and preferably used as an image receiving sheet for electrophotography in particular, an effective method for producing the image recording material, and an image forming method which is excellent in fixing-device passing performance by using the image recording material.

Means for solving the above problems are as follows:

<1> An image recording material having a support and an image recording layer containing a crystalline polymer and an amorphous polymer on at least one surface of the support, wherein the image recording layer has a storage elastic modulus G' at 100° C. of $1\times10^2$ Pa to $1\times10^5$ Pa during the course of a temperature increase at 5° C./min, a storage elastic modulus G' at 60° C. of $1\times10^6$ Pa or more during the course of a temperature decrease at 5° C./min and a temperature difference of 18° C. or less between a temperature at which the storage elastic modulus G' during the course of a temperature increase at 5° C./min reaches $1\times10^5$ Pa and a temperature at which the storage elastic modules G' during the course of a temperature decrease at 5° C./min reaches $1\times10^5$ Pa, upon measurement of viscoelasticity by using a rheometer having a plate-to-plate distance of 1.5 mm and a diameter of 20 mm.

<2> The image recording material according to the item <1>, wherein a mixed mass ratio of the crystalline polymer to the amorphous polymer (crystalline polymer:amorphous polymer) is 1:99 to 25:75.

<3> The image recording material according to any one of the items <1> to <2>, wherein the crystalline polymer has a melting point of 80° C. or more.

<4> The image recording material according to any one of the items <1> to <3>, wherein the crystalline polymer and the amorphous polymer are water dispersible.

<5> The image recording material according to any one of the items <1> to <4>, wherein the crystalline polymer is a crystalline self-dispersible polyester resin and the amorphous polymer is an amorphous self-dispersible polyester resin.

<6> The image recording material according to the item <5>, wherein the crystalline self-dispersible polyester resin and the amorphous self-dispersible polyester resin are a carboxyl group-containing self-dispersible polyester resin.

<7> The image recording material according to the item <6>, wherein the carboxyl group-containing crystalline self-dispersible polyester resin contains 50 mol % or less of a polyvalent carboxylic acid component having an aromatic ring as an acid derived component with respect to the total content of all the acid derived components.

<8> The image recording material according to any one of the items <1> to <7>, wherein the support has a raw paper and at least one layer of polyolefin resin layer on both surfaces of the raw paper.

<9> The image recording material according to any one of the items <1> to <8>, further comprising an intermediate layer which contains a polymer for intermediate layer having a glass transition temperature (Tg) equal to or lower than an image fixing temperature between the image recording layer and the support.

<10> The image recording material according to any one of the items <1> to <9>, being an image receiving sheet for electrophotography having the support and at least a single layer of toner image receiving layer on the support.

<11> A method for producing an image recording material, comprising:

forming an image recording layer by applying a coating solution for image recording layer containing a crystalline polymer and an amorphous polymer over a surface of a support and drying the applied coating solution to thereby produce an image recording material according to any one of the items <1> to <10>.

<12> An image forming method comprising, comprising:

forming a toner image on an image receiving sheet for electrophotography according to the item <10> which comprises a support and a toner image receiving layer containing a crystalline polymer and an amorphous polymer on at least one surface of the support, and smoothing and fixing the surface of an toner image formed in the toner image formation.

<13> The image forming method according to the item 12, wherein in the smoothing and fixing of the toner image surface, the toner image formed in the toner image formation is heated, pressurized, cooled, and peeled off by an image surface smoothing and fixing device having a heating and pressurizing member, a belt member and a cooling device.

<14> The image forming method according to the item <13>, wherein the belt member has a layer containing a fluorocarbon siloxane rubber on the surface thereof.

<15> The image forming method according to the item <14>, wherein the belt member has a layer containing a silicone rubber on the surface thereof and also the layer containing the fluorocarbon siloxane rubber on the layer containing the silicone rubber.

<16> The image forming method according to any one of the items <14> to <15>, wherein the fluorocarbon siloxane rubber has at least any one of a perfluoroalkyl ether group and a perfluoroalkyl group on its main chain.

The image recording material of the present invention has an image recording layer containing a crystalline polymer and an amorphous polymer on at least one surface of a support, and is characterized in that the image recording layer has a storage elastic modulus G' at 100° C. of $1\times10^2$ Pa to $1\times10^5$ Pa during the course of a temperature increase at 5° C./min, a storage elastic modulus G' at 60° C. of $1\times10^6$ Pa or more during the course of a temperature decrease at 5° C./min and a temperature difference of 18° C. or less between a temperature at which the storage elastic modulus G' during the course of a temperature increase at 5° C./min reaches $1\times10^5$ Pa and a temperature at which the storage elastic modules G' during the course of a temperature decrease at 5° C./min reaches $1\times10^5$ Pa, upon measurement of viscoelasticity by using a rheometer having a plate-to-plate distance of 1.5 mm and a diameter of 20 mm. Since the image forming material has excellent low temperature fixing property, excellent adhesion resistance and excellent peeling property from a fixing device, a highly glossy and high-quality image is formed thereon. In other words, since the image recording material has excellent low temperature fixing property, a highly glossy and high-quality image can be easily formed, with a decrease in unpleasant variance in gloss level developed on a border line between an image portion and a non-image portion, even when the image is fixed by using a fixing device small in energy consumption. Since the image recording material is also excellent in adhesion resistance, there is no chance that image recording layers of the image recording material adhere to each other resulting in peeling failure or the surface is damaged if peeled off, where the image recording material is allowed to stand for a prolonged time at high temperatures, with a load being applied, during storage and transportation. Further, since the image recording material is excellent in peeling property from a fixing device, an image recording layer of the image recording material will not adhere to a fixing unit to an extent more than necessary, the layer can be easily peeled off after adhesion, a highly glossy and high-quality image can be formed and paper can also be supplied stably.

The method for producing an image recording material of the present invention includes forming an image recording layer by applying a coating solution for image recording layer containing a crystalline polymer and an amorphous polymer over a surface of a support and drying the applied coating solution. For this reason, an image recording material which is favorable in low temperature fixing property, excellent in adhesion resistance, excellent in peeling property from a fixing device and capable of forming a highly glossy and high-quality image is effectively produced.

The image forming method of the present invention is a method for forming an image on the image receiving sheet for electrophotography, as one type of the image recording materials of the present invention, and includes the toner image forming step and the image surface smoothing and fixing step.

According to the image forming method of the present invention, a toner image is formed on the image receiving sheet for electrophotography of the present invention at the toner image forming step. Then, the surface of the toner image formed by the toner image forming step is smoothed at the image surface smoothing and fixing step. Thereby, it is possible to obtain a highly-smooth, highly-glossy and uniform image which is favorable in fixing-device passing performance.

DETAILED DESCRIPTION OF THE INVENTION

Image Recording Material

The image recording material of the present invention has a support and an image recording layer on at least one surface of the support, and further has an intermediate layer and other layers, when necessary. Each of these layers may be structured in a single layer or in two or more laminated layers.

<Image Recording Layer>

The image recording layer is a layer which is provided at least as a single layer on the support to record an image. The image recording layer corresponds to a thermal color-developing layer where the image recording material is a thermosensitive recording sheet, to an ink layer which contains a thermal diffusible dye (sublimation dye) where it is a sublimation transfer recording sheet, to a thermofusible ink layer where it is a thermal transfer recording sheet, to an emulsion layer which develops in color on YMC where it is a recording sheet for silver halide photography, to an ink receiving layer for receiving and retaining ink where it is an inkjet recording material, and to a toner image receiving layer where it is an image receiving sheet for electrophotography.

The image recording layer contains a crystalline polymer and an amorphous polymer, and also contains other constituents, whenever necessary.

Viscoelastic properties of the image recording layer need to satisfy the conditions that a storage elastic modulus G' at 100° C. is $1\times10^2$ Pa to $1\times10^5$ Pa during the course of a temperature increase at 5° C./min and a storage elastic modulus G' at 60° C. is $1\times10^6$ Pa or more during the course of a temperature decrease at 5° C./min, upon measurement of viscoelasticity by using a rheometer having a plate-to-plate distance (GAP) of 1.5 mm and a diameter of 20 mm.

Further, the temperature difference ΔT (hysteresis) between a temperature at which the storage elastic modulus G' during the course of a temperature increase at 5° C./min reaches $1\times10^5$ Pa and a temperature at which the storage elastic modules G' during the course of a temperature decrease at 5° C./min reaches $1\times10^5$ Pa needs to be 18° C. or less, and preferably 12° C. or less.

Where the temperature difference is 18° C. or less, the image recording layer is smoothly solidified during a temperature decrease, thereby making it possible to provide favorable image excellent in peeling property after fixation and free from scratches and variance in gloss level. Where it exceeds 18° C., the image recording layer is not solidified on a temperature decrease and the peeling property of an image recording material from a fixing device may be affected.

When the image recording layer exerts the above viscoelastic properties, the image recording material of the present invention achieves both excellent low temperature fixing property and excellent adhesion resistance. It is also excellent in peeling property from a fixing device, thereby making it possible to obtain a highly glossy and high-quality image.

Figure 1:
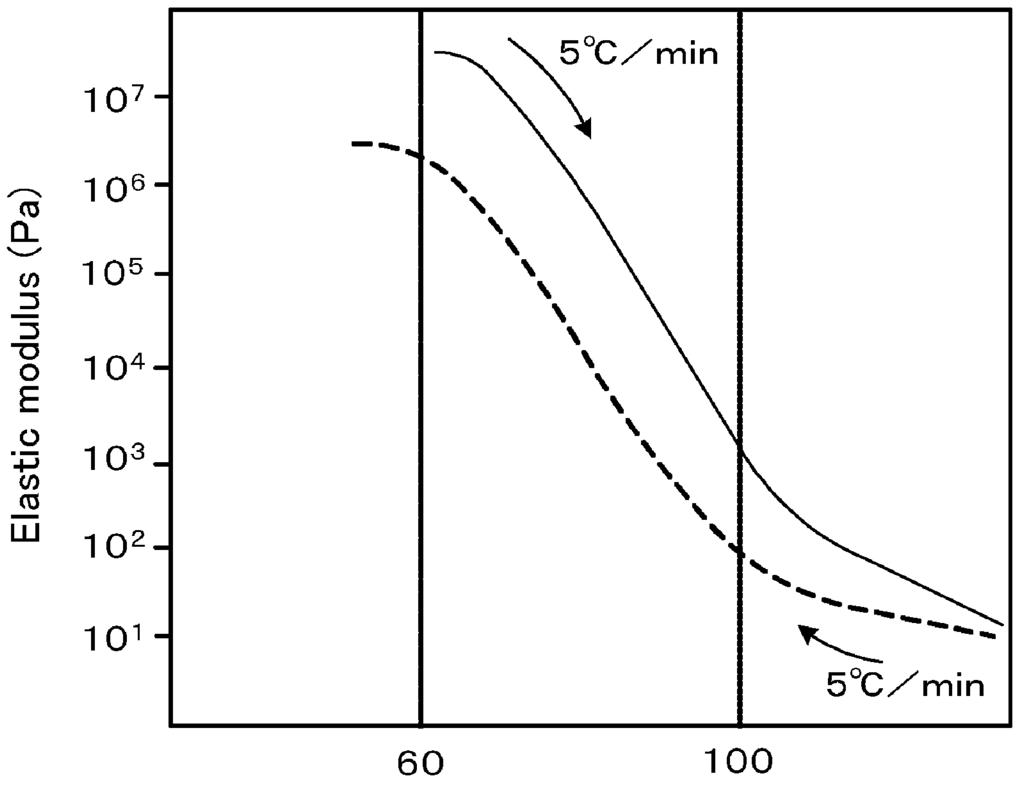
FIG. 1 is a conceptual diagram showing viscoelastic properties of an image recording layer in the image recording material of the present invention.
Figure 2:
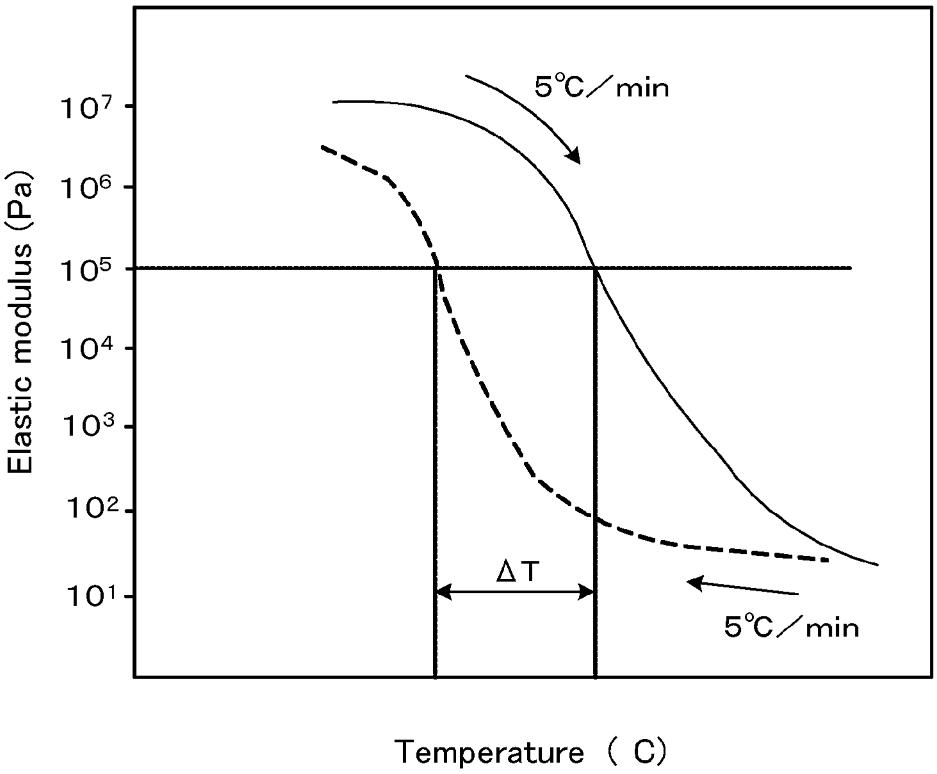
FIG. 2 is another conceptual diagram showing viscoelastic properties of the image recording layer in the image recording material of the present invention.

FIG. 1 and FIG. 2 are conceptual diagrams showing viscoelastic properties of an image recording layer in an image recording material of the present invention.

The storage elastic modulus G' at 100° C. during the course of a temperature increase at 5° C./min needs to be $1\times10^2$ Pa to $1\times10^5$ Pa, more preferably $1\times10^2$ Pa to $1\times10^4$ Pa, and in particular preferably $1\times10^2$ Pa to $1\times10^3$ Pa. When the storage elastic modulus G' at 100° C. is less than $1\times10^2$ Pa, for example, an image receiving sheet for electrophotography is favorable in toner fixing property but a narrow line may be thick or an image may be blurred. Where it exceeds $1\times10^5$ Pa, for example, an image receiving sheet for electrophotography may be poor in toner fixing property and decreased in gloss, which is not desirable.

On the other hand, the storage elastic modulus G' at 60° C. during the course of a temperature decrease at 5° C./min needs to be $1\times10^6$ Pa or more, more preferably $1\times10^6$ Pa to $5\times10^6$ Pa, and in particular preferably $4\times10^6$ Pa to $5\times10^6$ Pa. Where the storage elastic modulus G' at 60° C. is less than $1\times10^6$ Pa, an image recording material may easily adhere to another during storage of image recording layers superimposed at high temperatures, which is not desirable.

It is noted that viscoelastic properties of the image recording layer can be adjusted by mixing the crystalline polymer with the amorphous polymer at an appropriate ratio. In other words, the melting behavior of the image recording layer containing a mixture of the crystalline polymer and the amorphous polymer during the course of a temperature increase depends on melting of the crystalline polymer, whereas the solidifying behavior during cooling depends on the solidification of the amorphous polymer. Therefore, the crystalline polymer and the amorphous polymer are adjusted for the mixture ratio, by which the image recording material can achieve both excellent low temperature fixing property and excellent peeling property.

The mixed mass ratio (crystalline polymer:amorphous polymer) of the crystalline polymer to the amorphous polymer in the image recording layer is preferably 1:99 to 25:75, and more preferably 5:95 to 10:90. Where the mixed mass ratio of the crystalline polymer exceeds 25:75, the gloss property may be decreased, and where the mixed mass ratio is less than 1:99, for example, the image receiving sheet for electrophotography may be poor in toner fixing property and deteriorate in gloss property.

The crystalline polymer is contained in the image recording layer preferably at 1% by mass to 25% by mass and more preferably 5% by mass to 10% by mass. Where the content is less than 1% by mass, for example, an image receiving sheet for electrophotography may be decreased in toner fixing property and gloss level, where the content exceeds 25% by mass, the sheet may be decreased in gloss due to offset.

Further, a temperature difference between a melting point of the image recording layer during the course of a temperature increase and a solidifying point of the layer during the course of a temperature decrease measured by using a differential scanning calorimeter (DSC) is preferably 30° C. or less and more preferably 28° C. or less.

Where the temperature difference is less than 30° C., the image recording layer is smoothly solidified during a temperature decrease and excellent in peeling property after fixation, and where it exceeds 30° C., the layer is not solidified during a temperature decrease and may be poor in peeling property.

It is preferable in terms of the environment and workability that the image recording layer is formed with a coating solution for image recording layer including a crystalline polymer aqueous dispersion at least containing a crystalline polymer and an amorphous polymer aqueous dispersion at least containing an amorphous polymer.

The crystalline polymer aqueous dispersion contains at least a crystalline polymer, a basic compound and water, and it also contains other components, if necessary.

The amorphous polymer aqueous dispersion contains at least an amorphous polymer and water, and it also contains other components, if necessary.

In this instance, the amorphous polymer and the crystalline polymer mean polymers which are identified by the following method.

More specifically, in a nitrogen atmosphere, a polymer is heated from room temperature to 320° C., with the condition kept for 10 minutes. Then, the polymer is rapidly cooled approximately to room temperature and immediately heated again from room temperature to 320° C. at a temperature increasing speed at 5° C./min by use of a differential scanning calorimeter (DSC) to determine an endothermic curve on the basis of the crystallization and melting. In this endothermic curve, the polymer in which an endothermic peak attributable to crystallization and melting is observed is referred to as a "crystalline polymer" and that in which the endothermic peak is not observed is referred to as an "amorphous polymer."

Crystalline Polymer

The crystalline polymer is preferably water dispersible.

There are no particular restrictions on the crystalline polymer and any appropriate polymer may be selected according to the intended use. However, in view of productivity and the like, thermoplastic resins are preferable. The thermoplastic resins include, for example, crystalline polyester resins; polyolefin resins such as a polyethylene and a polypropylene; and other resins such as polyamide resin, polyether resin, polyester amide resin, polyetherester resin, polyvinyl alcohol resin and polyestermethacrylate resin, or copolymers mainly consisting of these resins. These resins may be used solely or in combination with two or more of them. Of these resins, in the case of an image receiving sheet for electrophotography, a crystalline polyester resin is more preferable in view of compatibility with the toner.

Crystalline Polyester Resin

The crystalline polyester resin is prepared by subjecting an acid component and an alcohol component to condensation polymerization. It also contains other components, if necessary.

There are no particular restrictions on the acid component and any appropriate acid may be selected according to the intended use. The acid component includes, for example, aliphatic dicarboxylic acids such as a dodecanedioic acid, sebacic acid, succinic acid, oxalic acid, malonic acid, maleic acid, fumaric acid, citraconic acid, itaconic acid, glutaconic acid, adipic acid, sebacic acid, azelaic acid, n-dodecyl succinic acid, n-dodecenyl succinic acid; aromatic dicarboxylic acids such as a phthalic acid, isophthalic acid, terephthalic acid; cycloaliphatic dicarboxylic acids such as cyclohexane dicarboxylic acid; and other acids such as 2,5-norbornene dicarboxylic acid, tetrahydro phthalic acid and anhydrous tetrahydro phthalic acid. These acids may be used solely or in combination with two or more of them. Of these acids, dodecanedioic acid, sebacic acid, succinic acid and terephthalic acid are preferable in view of an appropriate melting point, crystallization/melting heat and others.

There are no particular restrictions on the alcohol component, and any appropriate alcohol may be selected according to the intended use. The alcohol component includes, for example, ethylene glycol, propylene glycol, 1,4-butanediol, trimethylol propane, neopentyl glycol, glycerine, pentaerythritol, hydrogenated bisphenol A, sorbitol and glycols such as a sorbitol obtained by adding ethylene oxide or propylene oxide at one to several mols to each of two phenol hydroxyl groups of bisphenols. The alcohol components may be used solely or in combination with two or more of them. Of the alcohol components, in view of an appropriate melting point, crystal fusion heat and others, preferable are ethylene glycol, 1,4-butanediol and trimethylol propane.

Other components include, for example, an esterification catalyst and a depolymerizing agent.

There are no particular restrictions on the esterification catalyst, and any appropriate substances may be selected according to the intended use. The esterification catalyst includes, for example, titanium compounds and tin (II) compounds.

The titanium compounds include, for example, titanium diisopropylate bistriethanolaminate $[Ti(C_6H_{14}O_3N)_2(C_3H_7O)_2]$, titanium diisopropylate bisdiethanolaminate $[Ti(C_4H_{10}O_2N)_2(C_3H_7O)_2]$, titanium dipentylate bistriethanolaminate $[Ti(C_6H_{14}O_3N)_2(C_5H_{11}O)_2]$, titanium diethylate bis triethanolaminate $[Ti(C_6H_{14}O_3N)_2(C_2H_5O)_2]$, titanium dihydroxyoctylate bistriethanolaminate $[Ti(C_6H_{14}O_3N)_2(OHC_8H_{16}O)_2]$, titanium distearate bistriethanolaminate $[Ti(C_6H_{14}O_3N)_2(C_{18}H_{37}O_2)_2]$, titanium triisopropylate triethanolaminate $[Ti(C_6H_{14}O_3N)_3(C_3H_7O)_3]$, and titanium monopropylate tris (triethanolaminate) $[Ti(C_6H_{14}O_3N)_3(C_3H_7O)_1]$.

The tin (II) compounds include, for example, a tin carboxylate (II) having a carboxylic acid group having carbon atoms of 2 to 28 such as a tin oxalate (II), tin diacetate (II), tin dioctanoate (II), tin dilaurate (II), tin distearate (II), tin diolenate (II); dialkoxy tins (II) having an alkoxy group having 2 to 28 carbon atoms such as a dioctyloxy tin (II), dilauroxy tin (II), distearoxy tin (II), and dioleyloxy tin (II); oxidized tins (II), and tin sulfate (II).

The esterification catalyst is added preferably at 0.01 parts by mass to 1.0 part by mass and more preferably 0.1 parts by mass to 0.7 parts by mass with respect to a total of 100 parts by mass of the alcohol component and the acid component. Where the addition with respect to a total of 100 parts by mass of the alcohol component and the acid component is less than 0.01 parts by mass, the number average molecular mass is not increased greatly, which may result in cracks of an image recording layer. On the other hand, where the addition exceeds 1.0 part by mass, the catalyst is found as a foreign substance in the image recording layer to develop black spots on a white background, which may deteriorate the quality of an image.

There are no particular restrictions on the depolymerizing agent, and any appropriate agent may be selected according to the intended use. The depolymerizing agent includes, for example, tri-valent or higher polyvalent carboxylic acids such as a trimellitic acid and pyromellitic acid or anhydrates of these acids. These depolymerizing agents are used to cause reactions (depolymeriztion and addition reaction), by which a carboxyl group can be introduced into a crystalline polyester resin.

The acid component and the alcohol component can be subjected to condensation polymerization, for example, in the presence of the esterification catalyst in an inert gas atmosphere at temperatures from 180° C. to 280° C.

A melting point of the crystalline polyester resin is preferably at 80° C. or higher, more preferably 80° C. to 110° C. and in particular preferably 80° C. to 100° C. Where the melting point is less than 80° C., blocking may develop on an image recording material. In contrast, where it exceeds 110° C., for example, an image receiving sheet for electrophotography may be lower in toner fixing property and decreased in gloss level.

In this instance, the melting point can be measured, for example, by using a differential scanning calorimeter (DSC).

An acid value of the crystalline polyester resin is preferably 15 mg KOH/g to 40 mg KOH/g and more preferably 15 mg KOH/g to 30 mg KOH/g. Where the acid value is less than 15 mg KOH/g, a stable water dispersion may not be obtained. Where it exceeds 40 mg KOH/g, an image recording layer may be lower in strength or decreased in water resistance and moisture resistance.

In this instance, the acid value can be measured according to a method described in JIS K0070, for example.

The number average molecular mass of the crystalline polyester resin is preferably 5,000 to 10,000 and more preferably 5,000 to 7,000. Where the number average molecular mass is less than 5,000, an image recording layer is decreased in mechanical strength which may result in easy breakage of the image recording layer. Where it exceeds 10,000, for example, an image receiving sheet for electrophotography may be lower in toner fixing property and decreased in gloss level.

In this instance, the number average molecular mass can be measured, for example, by polystyrene conversion based on gel permeation chromatography (GPC) and tetrahydrofuran (eluate).

The crystalline polymer aqueous dispersion contains at least a crystalline polymer and also contains a basic compound, water and other components, if necessary. There are no particular restrictions on the crystalline polymer aqueous dispersion, which can be prepared by a known method.

The crystalline polymer aqueous dispersion is contained in the crystalline polymer preferably at 30% by mass to 40% by mass on solid content basis. Where the content is less than 30% by mass, a coating solution may be decreased in viscosity, and where it exceeds 40% by mass, the solution is more likely to increase in viscosity, thereby resulting in coagulation in spots.

The basic compound is added for dispersing crystalline polymer uniformly and stably in water. The basic compound includes, for example, ammonia with a low boiling point and an organic amine compound. The boiling point of the organic amine compound is preferably at 160° C. or less. Further, it is preferable that the organic amine compound is azeotropic with water. Where the boiling point is at 160° C. or higher, the basic compound may remain in an image recording layer, thereby decreasing the physical properties of film or giving off a bad smell, which is not desirable.

There are no particular restrictions on the basic compound, and any basic compound may be used according to the intended use. The basic compound includes, for example, ammonia, methylamine, dimethylamine, trimethylamine, ethylamine, diethylamine, triethylamine, propylamine, dipropylamine, isopropylamine, diisopropylamine, butylamine, dibutylamine, isobutylamine, diisobutylamine, sec-butylamine, tert-butylamine, pentylamine, N,N-dimethylethanolamine, N-methyl-N-ethanolamine, propylenediamine, morpholine, N-methylmorphorine, N-ethylmorpholine, and piperidine. The basic compounds may be used solely or in combination with two or more of them.

The crystalline polymer aqueous dispersion is contained in the basic compound preferably at 0.9 to 15-times equivalence with respect to the carboxyl group in such a quantity that can at least partially neutralize depending on a quantity of carboxyl group contained in a crystalline polyester resin. Where the quantity is less than 0.9-times equivalence, the dispersion may be difficult or aqueous dispersion may be decreased in stability. Where it exceeds 15-times equivalence, the aqueous dispersion may be greatly increased in viscosity.

Amorphous Polymer

The amorphous polymer is preferably water dispersible. There are no particular restrictions on the amorphous polymer, and any appropriate amorphous polymer may be selected according to the intended use. However, in view of productivity and others, thermoplastic resins are preferable. The thermoplastic resins include, for example, amorphous polyester resin, polyvinyl chloride resin, polystyrene resin, acrylonitrile-styrene copolymer, acrylonitrile-butadiene-styrene copolymer, polymethyl methacrylate acrylate resin, polycarbonate resin, modified polyphenylene ether resin, polyarylate resin, polysulfone resin polyetherimide resin, polyamideimide resin, polyimide resin, and copolymers mainly consisting of the above-described substances. The thermoplastic resins may be used solely or in combination with two or more of them. Of these resins, for example, in the case of an image receiving sheet for electrophotography, an amorphous polyester resin is more preferable in view of compatibility with the toner.

There are no particular restrictions on the amorphous polyester resin, and any known amorphous polyester can be selected appropriately according to the intended use. A commercially available product or an appropriately synthesized product may be used. Of the amorphous polyester resins, commercially available ones include, for example, BIRON series (BIRON 200, BIRON 296 and others) manufactured by Toyobo Co., Ltd.

The glass transition temperature of the amorphous polyester resin is preferably 30° C. to 120° C. Where the glass transition temperature is less than 30° C., the amorphous polyester resin is decreased in adhesion resistance, thereby resulting in an easy occurrence of blocking. Where it exceeds 120° C., for example, an image receiving sheet for electrophotography may be decreased in toner fixing property to result in a decreased gloss level.

Of the crystalline and amorphous polyester resins, self-dispersible polyester resins are preferable. Of the self-dispersible polyester resins, a carboxyl group-containing self-dispersible polyester resin is particularly preferable. In this instance, "the self-dispersible polyester resin" means a polyester resin capable of self-dispersing in an aqueous medium without using an emulsifying agent. Further, the "carboxyl group-containing self-dispersible polyester resin" means a polyester resin containing a carboxyl group as a hydrophilic group and capable of self-dispersing in an aqueous medium.

The self-dispersible polyester resin has (1) preferably the number average molecular mass (Mn) from 5,000 to 10,000, more preferably Mn from 5,000 to 7,000, (2) preferably the molecular weight distribution (mass average molecular mass/number average molecular mass) of 4 or more, and more preferably the molecular weight distribution of 3 or more, (3) preferably the glass transition temperature (Tg) from 40° C. to 100° C. and more preferably Tg from 50° C. to 80° C., and (4) preferably the volume average particle diameter from 20 nm to 200 nm and preferably the volume average particle diameter from 40 nm to 150 nm.

Since such self-dispersible polyester resins that satisfy the above characteristics are self-dispersible resins without using a surfactant, they are low in hygroscopicity even in a highly humid environment and less likely to have a decreased softening point due to water content, thereby preventing the occurrence of offset on fixation and the occurrence of adhesion failure between sheets during storage. Further, since these polyester resins are water dispersible, a water-soluble coating solution can be used as a coating solution for an image recording layer including the self-dispersible polyester resin, thereby making it possible to decrease an environmental load on production of image recording layer materials. They are also polyester resins which tend to assume a molecular structure high in coagulation energy. Therefore, an image recording layer containing the self-dispersible polyester resin is in a melted state low in elasticity (low in viscosity) in the fixing step of an image, with a sufficient hardness kept during storage, thereby making it possible to form a high-quality image excellent in fixing property.

The coating solution for an image recording layer may contain known resins, for example, vinyl resins such as a styrene-acryl copolymer resin; and other resins such as an epoxy resin, polycarbonate resin, and polyurethane resin, in addition to the above crystalline polymer aqueous dispersion and the amorphous polymer aqueous dispersion, as long as they do not adversely affect the objects and effects of the present invention.

The image recording layer can be used as an image recording layer of various image recording materials such as an image receiving sheet for electrophotography, thermosensitive recording sheet, sublimation transfer recording sheet, thermal transfer recording sheet, sheet for silver halide photography and inkjet recording sheet. The image recording layer can contain other components whenever necessary, according to the embodiments of various image recording materials, which will be described later.

There are no particular restrictions on the thickness of the image recording layer, and any thickness can be selected appropriately according to the intended use. The thickness is preferably 1 μm to 30 μm and more preferably 2 μm to 20 μm. Where the thickness is less than 1 μm, for example, an image receiving sheet for electrophotography may be decreased in toner fixing property to result in a decreased gloss. Where it exceeds 30 μm, the texture of photographic paper may be decreased.

<Support>

There are no particular restrictions on the support, and any appropriate support can be selected according to the intended use. The support includes, for example, raw paper, synthetic paper, synthetic resin sheet, coated paper, and laminated paper. The support may be structured in a single layer or two or more laminated layers. Among these, in view of the smooth gloss property and stretching property, preferable is laminated paper having at least one layer of polyolefin resin layer on both surfaces of raw paper.

<Raw Paper>

There are no particular restrictions on the raw paper, and any appropriate raw paper can be selected according to the intended use. However, preferable is fine paper. The fine paper includes, for example, that described in "Basis of Photographic Engineering, Silver Halide Photography-1" pp. 223-224, published by Corona Publishing Co., Ltd., (1979) and compiled by the Society of Photographic Science and Technology of Japan.

It is preferable that pulp fiber having a fiber length distribution (for example, a total of 24 mesh screen residue and 42 mesh screen residue is 20% by mass to 45% by mass and 24 mesh screen residue is 5% by mass or less) is used for the raw paper to impart a desired centerline average roughness to the surface, for example, as described in JP-A No. 58-68037. A machine calendar or a super calendar can be used to give heat and pressure for surface treatment, thereby adjusting the centerline average roughness.

There are no particular restrictions on raw materials of the raw paper, as long as they are any known materials used as a support. Any appropriate materials can be selected according to the intended use. The raw materials include, for example, natural pulp derived from broad-leaf trees and needle-leaf trees and a mixture of natural pulp and synthetic pulp.

Pulp, which can be used as a raw material of the raw paper, is preferably a broad-leaf bleached kraft pulp (LBKP) in view of the fact that the surface smoothness of raw paper, rigidity as well as dimensional stability (curl resistance) can be improved in a well-balanced manner to a satisfactory level. However, needle-leaf bleached kraft pulp (NBKP), and leaf bleached sulfite pulp (LBSP) may be used.

The pulp can be beaten by using a beater, a refiner and others.

The Canadian standard freeness of pulp is preferably 200 mL C.S.F. to 440 mL C.S.F. and more preferably 250 mL C.S.F. to 380 mL C.S.F. since paper can be controlled for shrinkage in paper making steps.

Pulp slurry, which is obtained after the pulp is beaten, (hereinafter, referred to as pulp paper stock) may contain, if necessary, various types of additives such as a filler, dry paper strength additive, sizing agent, wet paper strength additive, fixing agent, pH adjuster, softening agent, pitch control agent, slime control agent and others.

The filler includes, for example, calcium carbonate, clay, kaoline, white clay, talc, titanium oxide, diatomaceous earth, barium sulfate, aluminum hydroxide, magnesium hydroxide, calcinated clay, calcinated kaoline, delamikaoline, heavy calcium carbonate, light calcium carbonate, magnesium carbonate, barium carbonate, zinc oxide, silicon oxide, amorphous silica, aluminum hydroxide, calcium hydroxide, zinc hydroxide, urea formalin resin, polystyrene resin, phenol resin, and micro hollow grains.

The dry paper strength additive includes, for example, cationic starch, cationic polyacryl amide, anionic polyacryl amide, amphoteric polyacrylamide and carboxy modified polyvinyl alcohol.

The sizing agent includes, for example, higher fatty acid salts; a styrene-acrylic compound, petroleum resin-based sizing agents; rosin, rosin derivatives such as a maleic rosin, paraffin wax, alkyl ketene dimmer, alkenyl succinic anhydride (ASA), and compounds containing higher fatty acids such as epoxidized fatty acid amides.

The wet paper strength additive includes, for example, polyamine polyamide epichlorohydrin, melamine resin, urea resin, and epoxidized polyamide resin.

The fixing agent includes, for example, polyvalent metal salts such as aluminum sulfate and aluminum chloride; basic aluminum compounds such as a sodium aluminate, basic aluminum chloride and basic polyaluminium hydroxide; polyvalent metal compounds such as ferrous sulfate and ferric sulfate; water-soluble polymers such as starch, modified starch, polyacrylamide, urea resin, melamine resin, epoxy resin, polyamide resin, polyamine resin, polyethylene imine, vegetable gum, and polyethylene oxide; cationic polymers such as cationic starch; hydrophilic cross-linkage polymer particle dispersion, and various compounds such as their derivatives or modified products.

The pH adjuster includes, for example, caustic soda and sodium carbonate.

Examples of the softening agent include those described in "Paper and Paper Treatment Manual" (published by Shiyaku Time Co., Ltd. (1980) (pp. 554-555)).

Other agents include, for example, an antifoaming agent, dye, slime control agent, and fluorescent whitening agent.

These various types of additives may be used solely or in combination with two or more of them.

There are no particular restrictions on the content of these additives in the pulp paper stock, and any content may be selected according to the intended use. However, it is preferably 0.1% by mass to 1.0% by mass.

The raw paper is prepared by making the pulp paper stock containing various types of additives into paper by using a paper making machine such as a handmade paper making machine, Fourdrinier machine, cylinder paper making machine, twin wire machine or combination machine into paper and then drying. Further, if so desired, sizing may be imparted to the surface either after or before drying.

There are no particular restrictions on a processing solution used in the surface sizing, and any processing solution can appropriately be selected according to the intended use. The solution includes, for example, a water-soluble high molecular compound, water resistant substance, pigment, dye, and fluorescent whitening agent.

The water-soluble high molecular compound includes, for example, cationic starch, oxidized starch, polyvinyl alcohol, carboxy modified polyvinyl alcohol, carboxymethyl cellulose, hydroxyethyl cellulose, cellulose sulfate, gelatin, casein, sodium polyacrylate, sodium salt of styrene-maleic anhydride copolymer and sodium polystyrene sulfonate.

The water resistant substance includes, for example, styrene butadiene copolymer, ethylene-vinyl acetate copolymer, polyethylene, latex/emulsions such as a vinylidene chloride copolymer, polyamidepolyamine epichlorohydrin and synthetic wax.

The pigment includes, for example, calcium carbonate, clay, kaoline, talc, barium sulfate and titanium oxide.

It is preferable in view of improvements in rigidity and dimensional stability (curl resistance) that the raw paper has a ratio (Ea/Eb) of vertical Young's modulus (Ea) to lateral Young's modulus (Eb) in the range of 1.5 to 2.0. Where the ratio of Ea/Eb is less than 1.5 or in excess of 2.0, an image receiving sheet for electrophotography is likely to degrade in rigidity and curl resistance to result in an obstacle in traveling performance during transportation, which is not desirable.

In general, it is known that "stiffness" of paper varies depending on the difference in the beating manner. An elastic force (elastic modulus), which is imparted to paper made after beating, can be used as an important factor for expressing the degree of stiffness. In particular, by taking the relationship between density and dynamic elastic modulus exhibiting physical properties of viscoelastic substances contained in paper into account to measure the sound speed traveling through paper by an ultrasonic transducer, thereby it is possible to determine the elastic modulus of paper according to the following formula.

$$E=\rho c^2(1-n^2)$$

Wherein E denotes a dynamic elastic modulus; p is a density; "c" is a sound speed traveling through paper; and "n" is a Poisson ratio.

Further, in the case of plain paper, since "n" is approximately 0.2, the following formula may be used to make a calculation, without any significant difference.

$$E=\rho c^2$$

In other words, as long as the density and sound speed of paper can be measured, the elastic modulus can be obtained easily. Sonic Tester, Model SST-110 (manufactured by Nomura Shoji Co., Ltd.), or other known meters may be used to measure the sound speed by the above formula.

There are no particular restrictions on thickness of the raw paper, and any thickness can appropriately be selected according to the intended use. In general, the thickness is preferably 30 μm to 500 μm, more preferably 50 μm to 300 μm, and in particular more preferably 100 μm to 250 μm. Further, there are no particular restrictions on basis weight of the raw paper, and any basis weight can appropriately be selected according to the intended use. For example, the basis weight is preferably 50 $g/m^2$ to 250 $g/m^2$ and more preferably 100 $g/m^2$ to 200 $g/m^2$.

The raw paper is preferably subjected to calendar treatment. In the calendar treatment, it is preferable to give calendar treatment so that a metal roll is in contact with a surface on which an image recording layer of raw paper is provided.

The surface temperature of the metal roll is preferably 100° C. or more, more preferably 150° C. or more, and further preferably 200° C. or more. There are no particular restrictions on an upper limit of the surface temperature of the metal roll, and any upper limit of the surface temperature may appropriately be selected according to the intended use. For example, about 300° C. is preferable.

There are no particular restrictions on nip pressure on calendar treatment, and any nip pressure may appropriately be selected according to the intended use. The nip pressure is preferably 100 $kN/cm^2$ or more and more preferably 100 $kN/cm^2$ to 600 $kN/cm^2$.

There are no particular restrictions on a calendar used in the calendar treatment, and any appropriate calendar may be used according to the intended use. The calendar includes, for example, that having a soft calendar roll combined with a metal roll and a synthetic resin roll and that having a machine calendar roll made up of a pair of metal rolls. Among these, preferable is a calendar having a soft calendar roll, and more preferable is a long nip shoe calendar made up of a metal roll and a shoe roll via a synthetic resin belt in view of the availability of a long nip-width.

Polyolefin Resin Layer

The polyolefin resin layer is provided on both surfaces of raw paper at least by one layer and provided on an image recording layer of raw paper at least by two layers as a front surface polyolefin resin layer. The polyolefin resin layer consists of an outermost front surface polyolefin resin layer located furthest from the raw paper and a front surface polyolefin resin layer other than the outermost front surface polyolefin resin layer.

Where the front surface polyolefin resin layer is available by two laminated layers in the order of a lower polyolefin resin layer and an upper polyolefin resin layer on raw paper, the upper polyolefin resin layer is given as an outermost front surface polyolefin resin layer and the lower polyolefin resin layer is given as a front surface polyolefin resin layer other than the outermost front surface polyolefin resin layer.

Further, where the front surface polyolefin resin layer consists of three laminated layers in the order of a lower polyolefin resin layer, a middle polyolefin resin layer and an upper polyolefin resin layer on raw paper, the upper polyolefin resin layer is given as an outermost front surface polyolefin resin layer, and the lower polyolefin resin layer and the middle polyolefin resin layer are given as front surface polyolefin resin layers other than the outermost front surface polyolefin resin layer.

It is preferable that the density of the outermost front surface polyolefin resin layer is smaller than the density of at least any of the layers among front surface polyolefin resin layers other than the outermost front surface polyolefin resin layer. Thereby, no blisters resulting from heating on image formation, development or fixation develop, thus making it possible to record a high-quality image free from uneven recording or uneven fixation.

The density of the outermost front surface polyolefin resin layer is preferably 0.930 g/cm$^3$ or less and more preferably 0.925 g/cm$^3$ or less.

Further, the density of at least any of the layers among front surface polyolefin resin layers other than the outermost front surface polyolefin resin layer (average value for a plurality of layers) is preferably 0.930 g/cm$^3$ or more and 0.970 g/cm$^3$ or less, and more preferably 0.950 g/cm$^3$ or more and 0.970 g/cm$^3$ or less.

The thickness of at least any of the front surface polyolefin resin layers other than the outermost front surface polyolefin resin layer is preferably 15 μm or more, and more preferably 15 μm to 20 μm. Where the thickness is 15 μm or less, a limit temperature is lowered which withstands blisters and blisters may occur at a lower temperature.

Further, the thickness of the outermost front surface polyolefin resin layer is preferably 5 μm or more and more preferably 10 μm to 30 μm. Where the thickness of the outermost front surface polyolefin resin layer is less than 5 μm, an uneven recording or uneven fixation resulting from a tracking failure may be developed, and where it exceeds 30 μm, a productivity due to restrictions on a melting discharge quantity of polyolefin resin may be decreased.

There are no particular restrictions on the thickness of the back surface polyolefin resin layer, and any appropriate thickness may be selected according to the intended use. However, it is preferable in view of the curl balance to appropriately make an adjustment so that curls are flattened in a final configuration.

Polyolefin resins used in the polyolefin resin layer include, for example, a polyethylene, a polypropylene, a mixture of polypropylene with polyethylene, high-density polyethylene, and a mixture of high-density polyethylene with low-density polyethylene.

It is preferable that the outermost front surface polyolefin resin layer contains a low-density polyethylene with a density of 0.930 g/cm$^3$ or less (preferably 0.925 g/cm$^3$ or less) and also at least any of front surface polyolefin resin layers other than the outermost front surface polyolefin resin layer contains a high-density polyethylene with a density of 0.945 g/cm$^3$ or more (preferably 0.950 g/cm$^3$ or more).

The content of the high-density polyethylene with a density of 0.945 g/cm$^3$ or more contained in at least any of front surface polyolefin resin layers other than the outermost front surface polyolefin resin layer is preferably 30% by mass or more and more preferably 50% by mass or more.

Further, it is preferable that at least either the front surface or the back surface of the polyolefin resin layer contains either an organic pigment or an inorganic pigment.

The organic pigment includes, for example, ultramarine blue, cerian blue, phthalocyanine blue, cobalt violet, fast violet and manganese violet.

The organic pigment includes, for example, titanium dioxide, calcium carbonate, talc, stearic acid amide and zinc stearate.

Among these, preferable is titanium dioxide in view of degree of whiteness. Either anatase-type titanium dioxide or rutile-type titanium dioxide is usable as the titanium dioxide. The content of the titanium dioxide in the polyolefin resin layer is preferably 5% by mass to 30% by mass.

There are no particular restrictions on the method for forming the polyolefin resin layer, and any appropriate method may be selected according to the intended use. Included are any of the following methods such as a normal lamination method, sequential lamination method, lamination method in which a single-layered extrusion die or a multi-layered extrusion die such as feet-block type, multi-manifold type and multi-slot type and a laminator are used, and a co-extrusion coating method in which extrusion coating is performed in a multi-layered manner at the same time.

There are no particular restrictions on the configuration of a die used in the single-layered extrusion or the multi-layered extrusion, and any appropriate configuration may be selected according to the intended use. For example, preferable are a T die and a coat hanger die.

There are no particular restrictions on the thickness of the support, and any appropriate thickness may be selected according to the intended use. The thickness is preferably 25 μm to 300 μm, more preferably 50 μm to 260 μm, and in particular preferably 75 μm to 220 μm.

<Intermediate Layer>

In the present invention, an intermediate layer which contains a polymer for intermediate layer, may be provided between the support and the image recording layer.

The intermediate layer is formed, for example, by preparing a coating solution for intermediate layer to coat the solution. The coating solution for intermediate layer can be used to form the intermediate layer on the support relatively easily. Further, the coating solution for intermediate layer can be used, thereby allowing the polymer for intermediate layer to permeate in the thickness direction of the support.

It is preferable that the polymer for intermediate layer has a glass transition temperature equal to or lower than the fixing temperature of an image and is appropriate as the coating solution for intermediate layer. There are no particular restrictions on the polymer for intermediate layer, and any appropriate polymer can be selected according to the intended use, as long as the coating solution for intermediate layer can be prepared. For example, usable is a resin similar to the polymer for image recording layer. Among these, the water dispersible polymer is preferably used, and the self-dispersible polyester resin or water dispersible acryl resin is in particular preferably used.

The content of the polymer for intermediate layer in the intermediate layer is preferably 20% by mass or more with respect to a total mass of the intermediate layer and more preferably 30% by mass to 100% by mass.

The polymer for intermediate layer includes those which satisfy the physical properties described in JP-A No. 05-127413, JP-A No. 08-194394, JP-A No. 08-334915, JP-A No. 08-334916, JP-A No. 09-171265, and JP-A No. 10-221877.

It is noted that the various components such as those referred to with regard to the image recording layer may be freely formulated into the intermediate layer as long as they do not affect functions of the intermediate layer.

There are no particular restrictions on the thickness of the intermediate layer, and any appropriate thickness may be selected according to the intended use. The thickness is preferably 4 μm to 50 μm, for example.

Types of image recording materials used in the present invention are varied depending on the intended use and type of an image recording material to be used. Examples thereof include image receiving sheets for electrophotography, thermosensitive recording sheets, sublimation transfer recording sheets, thermal transfer recording sheets, sheets for silver halide photography and inkjet recording sheets.

Hereinafter, a specific description will be made individually for the image receiving sheet for electrophotography, the thermosensitive recording sheet, the sublimation transfer recording sheet, the thermal transfer recording sheet, the recording sheet for silver halide photography and the inkjet recording sheet.

<<Image Receiving Sheet for Electrophotography>>

The image receiving sheet for electrophotography has the support and a toner image receiving layer as an image recording layer of the present invention which is formed on at least one surface of the support at least by one layer. It also includes the intermediate layer and other layers, if necessary. Each of these layers may be structured in a single layer or laminated layers.

The support and the intermediate layer are the same as those which have been described. Hereinafter, a description will be made for the toner image receiving layer and other layers.

<Toner Image Receiving Layer>

The toner image receiving layer is an image receiving layer for receiving color toner and black toner to form an image. The image receiving layer has functions to receive toner for forming an image from a development drum or an intermediate transfer body with electricity (static electricity), pressure and others during the transfer step and to stabilize with heat, pressure and others during the fixation step.

The toner image receiving layer may contain, if necessary, various additives for improving the stability of an output image and also improving the stability of the toner image receiving layer itself, in addition to resin components described in the above image recording layer. The additives include, for example, a releasing agent, plasticizer, dye, filler, crosslinking agent, electrostatic adjusting agent, emulsifying agent, dispersing agent, antioxidant, anti-aging agent, antidegradant, antiozonant, ultraviolet absorbing agent, metal complex, light stabilizer, antiseptic agent, and fungicide. Further, the toner image receiving layer may contain known photographic additives, if necessary.

—Releasing Agent—

The releasing agent is formulated into the toner image receiving layer for preventing the offset of the toner image receiving layer. There are no particular restrictions on the releasing agent, and any appropriate releasing agent may be selected according to the intended use, as long as it is heated at a fixing temperature, melted to be unevenly distributed after deposition on the surface of the toner image receiving layer and solidified during cooling, thereby forming a releasing agent layer on the surface of the toner image receiving layer.

The releasing agents include, for example, a silicone compound, fluorine compound, wax and matting agent.

More specifically, compounds described in "Properties and Applications of Waxes (revision)" published by Saiwai Shobo and "Silicone Handbook" published by Nikkan Kogyo Shinbun Ltd. can be used as the releasing agent. Further, preferable are silicone compounds, fluorine compounds or waxes (however, excluding natural waxes) used in toners described in Japanese Patent Application Publication (JP-B) No. 59-38581, JP-B No. 04-32380, Japanese Patent (JP-B) No. 2838498, Japanese Patent (JP-B) No. 2949558, Japanese Patent Application Laid-Open (JP-A) No. 50-117433, JP-A No. 52-52640, JP-A No. 57-148755, JP-A No. 61-62056, JP-A No. 61-62057, JP-A No. 61-118760, JP-A No. 02-42451, JP-A No. 03-41465, JP-A No. 04-212175, JP-A No. 04-214570, JP-A No. 04-263267, JP-A No. 05-34966, JP-A No. 05-119514, JP-A No. 06-59502, JP-A No. 06-161150, JP-A No. 06-175396, JP-A No. 06-219040, JP-A No. 06-230600, JP-A No. 06-295093, JP-A No. 07-36210, JP-A No. 07-43940, JP-A No. 07-56387, JP-A No. 07-56390, JP-A No. 07-64335, JP-A No. 07-199681, JP-A No. 07-223362, JP-A No. 07-287413, JP-A No. 08-184992, JP-A No. 08-227180, JP-A No. 08-248671, JP-A No. 08-248799, JP-A No. 08-248801, JP-A No. 08-278663, JP-A No. 09-152739, JP-A No. 09-160278, JP-A No. 09-185181, JP-A No. 09-319139, JP-A No. 09-319143, JP-A No. 10-20549, JP-A No. 10-48889, JP-A No. 10-198069, JP-A No. 10-207116, JP-A No. 11-2917, JP-A No. 11-44969, JP-A No. 11-65156, JP-A No. 11-73049, and JP-A No. 11-194542. These substances may be used solely or in combination with two or more of them.

There are no particular restrictions on the silicone compounds, and any silicone compound may appropriately be selected according to the intended use. Included are, for example, silicone oil, silicone rubber, silicone fine particles, silicone modified resins and reactive silicone compounds.

The silicone oil includes, for example, non-modified silicone oil, amino modified silicone oil, carboxy modified silicone oil, carbinol modified silicone oil, viny modified silicone oil, epoxy modified silicone oil, polyether modified silicone oil, silanol modified silicone oil, methacryl modified silicone oil, mercapto modified silicone oil, alcohol modified silicone oil, alkyl modified silicone oil, and fluorine modified silicone oil.

The silicone modified resin includes, for example, olefin resin, polyester resin, vinyl resin, polyamide resin, cellulose resin, phenoxy resin, vinyl chloride-vinyl acetate resin, urethane resin, acryl resin, styrene-acryl resin, or resins prepared by subjecting these copolymer resins to silicone modification.

There are no particular restrictions on the fluorine compound, and any fluorine compound may appropriately be selected according to the intended use. The fluorine compound includes, for example, fluorine oil, fluorine rubber, fluorine modified resin, fluorine sulfonic acid compound, fluoro-sulfonic acid, a fluoride compound or the base thereof, and an inorganic fluoride.

The waxes include natural waxes and synthetic waxes.

There are no particular restrictions on natural waxes, and any natural wax may appropriately be selected according to the intended use. Any wax at least selected from a plant-derived wax, an animal-derived wax, a mineral-derived wax and a petroleum-derived wax is preferable, and a plant-derived wax is particularly preferable.

There are no particular restrictions on plant-derived waxes, and any plant wax may appropriately be selected from known plant waxes according to the intended use. A commercially available wax or an appropriately synthesized one may be acceptable. The plant-derived waxes include, for example, carnauba wax, castor oil, rapeseed oil, soybean oil, sumac wax, cotton wax, rice wax, sugarcane wax, candelilla wax, Japan wax, and jojoba oil (*Simondsia chinensis*). The carnauba wax is commercially available, for example, as EMUSTAR-0413 from Nippon Seiro Co., Ltd. and SERZOLE 524 manufactured by Chukyo Yushi Co., Ltd. Castor oil is commercially available, for example, as purified castor oil manufactured by Itoh Oilchem Co., Ltd. Among these, preferable is carnauba wax having a melting point of 70° C. to 95° C. in view of the fact that it is excellent in offset resistance, adhesion resistance, paper permeability and gloss, less likely to cause cracks and able to provide an image receiving sheet for electrophotography for forming high-quality images.

A water dispersible wax is preferable as the natural wax in view of compatibility where a water-borne resin is used as the polymer for a toner image receiving layer.

There are no particular restrictions on animal-derived waxes and any animal-derived wax may appropriately be selected from known ones, for example, bees wax, lanolin, whale oil, blubber oil (whale oil), and wool wax.

There are no particular restrictions on mineral-derived wax, and any mineral wax may appropriately be selected from known waxes. A commercially available mineral wax or an appropriately synthesized one may be acceptable. The mineral-derived wax includes, for example, montan wax, montan-based ester wax, ozokerite, and ceresin.

Among these, preferable is montan wax having a melting point of 70° C. to 95° C. in view of the fact that it is excellent in offset resistance, adhesion resistance, paper permeability and gloss, less likely to cause cracks and able to provide an image receiving sheet for electrophotography for forming high-quality images.

There are no particular restrictions on petroleum-derived wax, and any petroleum-derived wax may appropriately be selected from known ones. A commercially available wax or an appropriately synthesized one may be acceptable. The petroleum-derived wax includes, for example, paraffin wax, micro-crystalline wax, and petrolatum.

The content of natural wax in the toner image receiving layer is preferably 0.1 $g/m^2$ to 4 $g/m^2$ and more preferably 0.2 $g/m^2$±2 $g/m^2$. Where the content is less than 0.1 $g/m^2$, the toner image receiving layer may be inferior in offset resistance and adhesion resistance. Where the content exceeds 4 $g/m^2$, the wax is excessively contained to result in a poor quality of image.

The melting point of natural wax is preferably 70° C. to 95° C. and more preferably 75° C. to 90° C. in view of the offset resistance and paper permeability.

Synthetic wax can be classified into synthetic hydrocarbon, modified wax, hydrogenated wax, and other oil-based synthetic waxes.

Synthetic hydrocarbon includes, for example, Fischer-Trosch wax and polyethylene wax.

There are no particular restrictions on modified wax, and any modified wax may appropriately be selected according to the intended use. Modified wax includes, for example, amine modified wax, acrylic acid modified wax, fluorine modified wax, olefin modified wax, urethane-type wax and alcohol-type wax.

There are no particular restrictions on hydrogenated wax, and any hydrogenated wax may appropriately be selected according to the intended use. Hydrogenated wax, includes, for example, hardened castor oil, castor oil derivative, stearic acid, lauric acid, myristic acid, palmitic acid, behenic acid, sebacic acid, undecylenic acid, heptyl acid, maleic acid, and high maleic oil (HIMALEIN).

There are no particular restrictions on other oil-based synthetic waxes, and any other oil-based synthetic wax may be selected according to the intended use. Included are, for example, an acid amide compound (stearic acid amide or the like) and an acid imide compound (anhydrous phthalic imide or the like).

There are no particular restrictions on the matting agent, and it may be selected from many known matting agents. Solid particles used as the matting agent can be classified into inorganic particles and organic particles. Materials of the inorganic matting agent include, for example, oxides (such as silicon dioxide, titanium oxide, magnesium oxide, aluminum oxide), alkaline earth metal salts (such as barium sulfate, calcium carbonate, magnesium sulfate), silver halides (such as silver chloride, silver bromide) and glass.

The inorganic matting agent includes, for example, those described in West German Patent No. 2529321, UK Patent No. 760775, UK Patent No. 1260772, U.S. Pat. No. 1,201,905, U.S. Pat. No. 2,192,241, U.S. Pat. No. 3,053,662, U.S. Pat. No. 3,062,649, U.S. Pat. No. 3,257,206, U.S. Pat. No. 3,322,555, U.S. Pat. No. 3,353,958, U.S. Pat. No. 3,370,951, U.S. Pat. No. 3,411,907, U.S. Pat. No. 3,437,484, U.S. Pat. No. 3,523,022, U.S. Pat. No. 3,615,554, U.S. Pat. No. 3,635,714, U.S. Pat. No. 3,769,020, U.S. Pat. No. 4,021,245, and U.S. Pat. No. 029,504.

Materials of the organic matting agent include starch, cellulose esters (such as cellulose acetate propionate), cellulose ethers (such as ethyl cellulose) and synthetic resins. The synthetic resins are preferably water-insoluble or low-water dispersible. These water-insoluble or low-water dispersible synthetic resins include, for example, a poly(meth)acrylic esters (such as a polyalkyl(meth)acrylate, polyalcokyalkyl (meth)acrylate, polyglycidyl(meth)acrylate), a poly (meth) acrylamide, polyvinylesters (such as a poly vinyl acetate), polyacrylonitrile, polyolefins (such as a polyethylene), polystyrene, benzoguanamine resin, formaldehyde condensation polymer, epoxy resin, polyamide, polycarbonate, phenol resin, polyvinyl carbazole, and polyvinylidene chloride.

The organic matting agent may be a copolymer in which monomers used in the above-described polymer are combined.

The copolymer may contain a small quantity of hydrophilic repeating units. Monomers which constitutes the hydrophilic repeating units include, for example, acrylic acid, methacrylic acid, α,β-unsaturated dicarboxylic acid, hydroxyalkyl(meth)acrylate, sulfoalkyl(meth)acrylate, and styrene sulfonic acid.

The organic matting agent includes, for example, those described in U. K. Patent No. 1055713, U.S. Pat. No. 1,939,213, U.S. Pat. No. 2,221,873, U.S. Pat. No. 2,268,662, U.S. Pat. No. 2,322,037, U.S. Pat. No. 2,376,005, U.S. Pat. No. 2,391,181, U.S. Pat. No. 2,701,245, U.S. Pat. No. 2,992,101, U.S. Pat. No. 3,079,257, U.S. Pat. No. 3,262,782, U.S. Pat. No. 3,443,946, U.S. Pat. No. 3,516,832, U.S. Pat. No. 3,539,344, U.S. Pat. No. 3,591,379, U.S. Pat. No. 3,754,924, U.S. Pat. No. 3,767,448, JP-A No. 49-106821, and JP-A No. 57-14835.

Further, the organic matting agent may be such that two or more types of solid particles are used in combination. The average grain size of the solid particles is preferably 1 μm to 100 μm and more preferably 4 μm to 30 μm. A quantity of the solid particles is preferably 0.01 $g/m^2$ to 0.5 $g/m^2$ and more preferably 0.02 $g/m^2$ to 0.3 $g/m^2$.

The melting point (° C.) of the releasing agent is preferably 70° C. to 95° C. and more preferably 75° C. to 90° C. in view of the offset resistance and paper permeability.

Releasing agents to be added to the toner image receiving layer may be derivatives, oxides, purified products or mixtures thereof. Further, they may contain a reactive substituent.

The content of the releasing agent is preferably 0.1% by mass to 10% by mass with respect to the mass of the toner image receiving layer, more preferably 0.3% by mass to 8.0% by mass, and in particular preferably 0.5% by mass to 5.0% by mass. Where the content is less than 0.1% by mass, the toner image receiving layer may be insufficient in offset resistance and adhesion resistance, and where it exceeds 10% by mass, the releasing agent is excessively contained to result in a poor image quality.

—Plasticizer—

There are no particular restrictions on the plasticizers, and any plasticizer may appropriately be selected from known ones according to the intended use. The plasticizers have functions to adjust the fluidization or softening of the toner image receiving layer by using heat or pressure on fixation of the toner to the toner image receiving layer.

The plasticizers may be used also for the purpose of adjusting the sliding property (improvements in transportation property due to decrease in frictional force), improvements in offset at a fixing portion (peeling of the toner and the layer to the fixing portion), adjustment of curl balance and regulation of electrostatic charge (formation of a toner electrostatic image).

Examples of the plasticizers include those described in Kagaku Binran "Chemical Handbook" (ed. The Chemical Society of Japan, Maruzen), Kasozai—Sono riron to ouyou "Plasticizers—Theory and Application" (edited by Koichi Murai, Saiwai Shobo), Kasozai no kenkyu—jou "The Study of Plasticizers, Part 1" and Kasozai no kenkyu—ge "The Study of Plasticizers, Part 2" (edited by Polymer Chemistry Association), or Binran-Gomu purasuchikku haigou yakuhin "Handbook of Rubber and Plastics Blending Agents" (ed. Rubber Digest Co. Ltd.), or the like.

The plasticizers are described as a high-boiling point organic solvent or a thermal solvent and include, for example, esters (such as phthalic acid esters, phosphoric acid esters, fatty acid esters, abietic acid esters, adipic acid esters, sebacic acid esters, azelaic acid esters, benzoic acid esters, butyrate esters, epoxidized fatty acid esters, glycolic acid esters, propionic acid esters, trimellitic acid esters, citric acid esters, sulfonic acid esters, carboxylic acid esters, succinic acid esters, maleic acid esters, fumaric acid esters, phthalic acid esters, stearic acid esters), amides (such as fatty acid amides, sulfoamides), ethers, alcohols, lactones, polyethyleneoxy products described in JP-A No. 59-83154, JP-A No. 59-178451, JP-A No. 59-178453, JP-A No. 59-178454, JP-A No. 59-178455, JP-A No. 59-178457, JP-A No. 62-174754, JP-A No. 62-245253, JP-A No. 61-209444, JP-A No. 61-200538, JP-A No. 62-8145, JP-A No. 62-9348, JP-A No. 62-30247, JP-A No. 62-136646, and JP-A No. 02-235694. These plasticizers may be used by mixing with a resin.

A relatively-low molecular weight polymer may be used as the plasticizer. A molecular weight of the plasticizer is preferably lower than that of a binder resin to be plasticized. More specifically, the molecular weight is preferably 15,000 or less and more preferably 5,000 or less. Further, where the plasticizer is a polymer, the polymer is preferably the same type of polymer as a binder resin to be plasticized. For example, polyester resin is preferably plasticized by using low-molecular weight polyester as a plasticizer. Still further, an oligomer is usable as a plasticizer.

For the plasticizer, commercially available products are exemplified, for example, plasticizers described in Adekasizer PN-170, PN-1430 (manufactured by ADEKA Corporation), PARAPLEX-G-25, G-30, G-40 (manufactured by C.P. Hall Company), Ester Gum 8L-JA, Ester R-95, Pentalin 4851, FK115, 4820, 830, LUEZOLE 28-JA, PICORA STICK A75, PICOTEX LC, and Crystalex 3085 (manufactured by Rika Hercules Corp.).

The plasticizer may be available in a state of being dispersed minutely, in a phase separation minutely like a sea-island structure, or in a state of being sufficiently mixed and dissolved with other components such as a binder in the toner image receiving layer.

The content of the plasticizer in the toner image receiving layer is preferably 0.001% by mass to 90% by mass, preferably 0.1% by mass to 60% by mass, and in particular preferably 1% by mass to 40% by mass.

—Dye—

There are no particular restrictions on dyes, and any dye may appropriately be selected according to the intended use. The dyes include, for example, a fluorescent whitening agent, white pigment, colored pigment and dye.

There are no particular restrictions on the fluorescent whitening agent, as long as it is a known compound having absorption at a near-ultraviolet region and exhibiting fluorescence at 400 nm to 500 nm. Any appropriate fluorescent whitening agent may be selected from known ones. Preferable are, for example, the compounds described in "The Chemistry of Synthetic Dyes" Vol. 8 compiled by K. Veen Rataraman. The fluorescent whitening agent may be a commercially available one or an appropriately synthesized one, including, for example, stilbene compounds, coumarin compounds, biphenyl compounds, benzooxazoline compounds, naphthalimide compounds, pyrazoline compounds, and carbostyryl compounds. The commercial-available fluorescent whitening agent includes, for example, WHITE FULFA PSN, PHR, HCS, PCS, B (all manufactured by Sumitomo Chemical Co., Ltd.) and UVITEX-OB (manufactured by Ciba-Geigy).

There are no particular restrictions on the white pigment, and any white pigment may appropriately be selected from known ones according to the intended use. The white pigment includes inorganic pigments such as titanium oxide and calcium carbonate.

There are no particular restrictions on the colored pigment, and any colored pigment may appropriately be selected from known ones according to the intended use. The colored pigment includes, for example, various types of pigments described in JP-A No. 63-44653, that is, azo pigments, polycyclic pigments, condensed polycyclic pigments, lake pigments and carbon black.

The azo pigments include, for example, azo lakes (such as carmine 6B and red 2B), insoluble azo pigments (such as monoazo yellow, disazo yellow, pyrazolo orange and vulcan orange), and condensed azo pigments (such as chromophthal yellow and chromophthal red).

The polycyclic pigments include, for example, phthalocyanine pigments such as copper phthalocyanine blue and copper phthalocyanine green.

The condensed polycyclic pigments include, for example, dioxazine pigments (such as dioxazine violet), isoindolinone pigments (such as isoindolinone yellow), sullen pigments, perylene pigments, pelynon pigments and thioindigo pigments.

The lake pigments include, for example, malachite green, rhodamine B, rhodamine G, and victoria blue B.

The inorganic pigments include, for example, oxides (such as titanium dioxide, red iron oxide), sulphates (such as sedimentary barium sulfate), carbonates (such as sedimentary calcium carbonate), silicates (such as hydrous silicate, anhydrous silicate) metal powders (such as aluminum powder, bronze powder, zinc powder, chrome yellow, iron blue). They may be used solely or in combination with two or more of them.

There are no particular restrictions on dyes, and any dye may appropriately be selected from known ones according to the intended use. The dyes include, for example, water-insoluble dyes such as antraquinone compounds and azo compounds. They may be used solely or in combination with two or more of them.

The water-insoluble dyes include, for example, vat dyes, disperse dyes, and oil-soluble dyes.

The vat dyes include, for example, C. I. Vat violet 1, C. I. Vat violet 2, C. I. Vat violet 9, C. I. Vat violet 13, C. I. Vat violet 21, C. I. Vat blue 1, C. I. Vat blue 3, C. I. Vat blue 4, C. I. Vat blue 6, C. I. Vat blue 14, C. I. Vat blue 20, and C. I. Vat blue 35.

The disperse dyes include, for example, C. I. disperse violet 1, C. I. disperse violet 4. C. I. disperse violet 10, C. I. disperse blue 3, C. I. disperse blue 7, and C. I. disperse blue 58.

The oil-soluble dyes include, for example, C. I. solvent violet 13, C. I. solvent violet 14, C. I. solvent violet 21, C. I. solvent violet 27, C. I. solvent blue 11, C. I. solvent blue 12, C. I. solvent blue 25, and C. I. solvent blue 55.

It is noted that colored couplers used in silver salt photography can be favorably used as dyes.

The content of the dye in the toner image receiving layer is preferably 0.1 $g/m^2$ to 8 $g/m^2$ and more preferably 0.5 $g/m^2$ to 5 $g/m^2$. Where the content is less than 0.1 $g/m^2$, the toner image receiving layer may be high in light transmittance, and where the content exceeds 8 $g/m^2$, the agent may be inferior in handling performance such as cracks and adhesive properties resistance.

Further, of the dyes, the content of a pigment is preferably 40% by mass or less with respect to a total mass of thermoplastic resins constituting the toner image receiving layer, more preferably 30% by mass or less and in particular preferably 20% by mass or less.

—Filler—

The fillers can be classified into organic fillers and inorganic fillers. Known substances such as a reinforcing agent for binder resin, a filler and a strengthening agent may be used for this purpose.

The fillers include, for example, those described in Binran-Gomu purasuchikku haigou yakuhin "Handbook of Rubber and Plastics Blending Agents" (edited by Rubber Digest Co., Ltd.), "New Edition-Plastic Blending Agents: Basis and Application" (Taiseisha), and "Filler Handbook" (Taiseisha) and others.

Inorganic fillers (inorganic pigments) are favorably used as the filler. The inorganic fillers (inorganic pigments) include, for example, silica, alumina, titanium dioxide, zinc oxide, zirconium oxide, micaceous iron oxide, lead white, lead oxide, cobalt oxide, strontium chromate, molybdenum pigments, smectite, magnesium oxide, calcium oxide, calcium carbonate and mullite. Among these, silica and alumina are particularly preferable. These substances may be used solely or in combination with two or more of them.

Further, a filler small in grain size is preferable as the filler. Where the grain size is large, the surface of the toner image receiving layer is easily made rough.

There are no particular restrictions on silica. Both spherical silica and amorphous silica may be used. Among these, colloidal silica is preferable. Further, the silica is preferably porous. The silica can be synthesized by a dry method, a wet method or an aerogel method. Still further, the surface of hydrophobic silica particles may be treated with a trimethylsilyl group or silicone.

There are no particular restrictions on alumina, and both anhydrous alumina and hydrated alumina can be used. However, hydrated alumina is preferable to anhydrous alumina. Further, the alumina is preferably porous.

The anhydrous alumina with a crystalline type of $\alpha$, $\beta$, $\gamma$, $\delta$, $\zeta$, $\eta$, $\theta$, $\kappa$, $\rho$ or $\chi$ can be preferably used. The anhydrous alumina is obtained by heating and dehydrating hydrated alumina.

Regarding the hydrated alumina, its monohydrate or trihydrate can be preferably used. The monohydrate includes, for example, pesudo-boehmite, boehmite and diaspore. The trihydrate includes, for example, gibbsite and bayerite. The hydrated alumina is synthesized by a sol-gel process in which ammonia is added to aluminum salt solution to cause precipitation or by a method for subjecting alkali aluminate to hydrolysis.

The fillers are added preferably as 5 parts by mass to 2,000 parts by mass with respect to 100 parts by mass on a dry mass basis of a binder of the toner image receiving layer.

—Crosslinking Agent—

The crosslinking agents may be contained to adjust the storage stability and thermal plasticity of the toner image receiving layer. The crosslinking agents include, for example, a compound having two or more of epoxy groups, isocyanate groups, aldehyde groups, active halogen groups, active methylene groups, acetylene groups as a reaction group or other known reaction groups in a molecule and a compound having two or more of the groups which can form a bond by hydrogen bonds, ionic bonds or coordinate bonds.

More specifically, known compounds acting as a coupling agent, curing agent, polymerizing agent, polymerization accelerator, coagulating agent, film forming agent and film forming accelerator for resin formation may be used as the crosslinking agents. The coupling agents include, for example, chlorosilanes, vinylsilanes, expoxysilanes, aminosilanes, alcoxyaluminium chelates, and titanate coupling agents. Also usable are those known substances described in Binran-Gomu purasuchikku haigou yakuhin "Handbook of Rubber and Plastics Blending Agents" (edited by Rubber Digest Co. Ltd.) or the like.

—Electrostatic Adjusting Agent—

The electrostatic adjusting agents may be contained to adjust the transfer properties and adhesive properties of toner to the toner image receiving layer and to prevent electrostatic adhesive properties of the toner image receiving layer.

There are no particular restrictions on the electrostatic adjusting agents, and various known electrostatic adjusting agents may be appropriately selected according to the intended use. The electrostatic adjusting agent includes, for example, high-polymer electrolytes and electrically-conductive metal oxides, in addition to surfactants such as a cationic surfactant, anionic surfactant, amphoteric surfactant and nonionic surfactant. The cation surfactant includes, for example, quaternary ammonium salt, polyamine derivative, cationic modified polymethylmethacrylate and cationic modified polystyrene. The anionic surfactant includes, for example, alkylphosphate and anionic polymer. The nonionic surfactant includes, for example, aliphatic ester and polyethylene oxide.

Where toner is negatively charged, the electrostatic adjusting agent formulated into the toner image receiving layer is preferably either a cationic surfactant or nonionic surfactant.

The electrically-conductive metal oxides include, for example, ZnO, $TiO_2$, $SnO_2$, $Al_2O_3$, $In_2O_3$, $SiO_2$, MgO, BaO and $MoO_3$. These substances may be used solely or in combination of two or more of them. The electrically-conductive metal oxides may be allowed to additionally contain different types of elements (doping). For example, ZnO is allowed to contain (doping) Al, In, and others, $TiO_2$ is allowed to contain Nb, Ta and others, and $SnO_2$ is allowed to contain Sb, Nb, halogen elements and others.

—Metal Complex—

There are no particular restrictions on metal complexes, and any metal complex may appropriately be selected according to the intended use. The metal complexes include, for example, those described in U.S. Pat. No. 4,241,155, U.S. Pat. No. 4,245,018, U.S. Pat. No. 4,254,195, JP-A No. 61-88256, JP-A No. 62-174741, JP-A No. 63-199248, JP-A No. 01-75568, and JP-A No. 01-74272.

Also favorably usable are ultraviolet absorbing agents and light stabilizers described in Binran Gomu purasuchikku hangout yakuhin "Handbook of Rubber and Plastics Blending Agents—$2^{nd}$ Revised Edition" (edited by Rubber Digest Co., Ltd., 1993, pp. 122-137).

—Photographic Additive—

The photographic additives include, for example, the compounds described in Research Disclosure Journal (hereinafter abbreviated as RD) No. 17643 (December 1978), RD No. 18716 (November 1979) and RD No. 307105 (November 1989). The parts related to the photographic additive in the above documents are summarized as follows.

TABLE 1

| Type of additives | RD17643 | RD18716 | RD307105 |
|---|---|---|---|
| Brightening agent | Page 24 | Right column on page 648 | Page 868 |
| Stabilizing agent | Pages 24 to 25 | Right column on page 649 | Pages 868 to 870 |
| Light absorbing agent (ultraviolet absorbing agent) | Pages 25 to 26 | Right column on page 649 | Page 873 |
| Dye/image stabilizing agent | Page 25 | Right column on page 650 | Page 872 |
| Hardening agent | Page 26 | Left column on page 651 | Pages 874 to 875 |
| Binder | Page 26 | Left column on page 651 | Pages 873 to 874 |
| Plasticizer, lubricating agent | Page 27 | Right column on page 650 | Page 876 |
| Coating aid, (surfactant) | Pages 26 to 27 | Right column on page 650 | Pages 875 to 876 |
| Static-preventive agent | Page 27 | Right column on page 650 | Pages 876 to 877 |
| Matting agent | — | — | Pages 878 to 879 |

—Antioxidant—

There are no particular restrictions on antioxidants, and any appropriate antioxidant may be selected according to the intended use. The antioxidants include, for example, chroman compounds, coumaran compounds, phenol compounds (such as hindered phenol), hydroquinone derivatives, hindered amine derivatives, and spiroindan compounds. The antioxidants are those described in JP-A No. 61-159644 and others.

—Anti-Aging Agent—

There are no particular restrictions on anti-aging agents, and any anti-aging agents may appropriately be selected according to the intended use.

The anti-aging agents include, for example, those described in Binran-Gomu purasuchikku haigou yakuhin "Handbook of Rubber and Plastics Blending Agents $2^{nd}$ Revised Edition" (edited by Rubber Digest Co. Ltd., 1993, pp. 76-121).

—Ultraviolet Absorbing Agent—

There are no particular restrictions on the ultraviolet absorbing agents, and any ultraviolet absorbing agent may appropriately be used according to the intended use. The ultraviolet absorbing agents include, for example, benzotriazole compounds (U.S. Pat. No. 3,533,794), 4-thiazolidone compounds (refer to U.S. Pat. No. 3,352,681), benzophenone compounds (refer to JP-A No. 46-2784), and ultraviolet absorbing polymers (refer to JP-A No. 62-260152).

The toner image receiving layer is formed by coating the coating solution for toner image receiving layer on the support by a wire coater and drying the resultant.

The coated mass after drying on the toner image receiving layer is preferably, for example, 1 $g/m^2$ to 20 $g/m^2$ and more preferably 4 $g/m^2$ to 15 $g/m^2$.

[Properties of Toner Image Receiving Layer]

The peeling strength of the toner image receiving layer at a fixing temperature of 180° C. with respect to a fixing member is preferably 0.1 N/25 mm or less and more preferably 0.041 N/25 mm or less.

In this instance, the peeling strength at 180° C. can be measured by using a surface material on the fixing member in accordance with a method described in JIS K6887.

It is preferable that the toner image receiving layer is high in gloss level after an image is formed. The gloss level at an entire area from a white area where no toner is applied to a black area where the toner is applied at a maximum concentration, for example, a gloss level at 20 degrees is preferably 60 to 110, more preferably 75 to 110 and in particular preferably 90 to 100. Where the gloss level at 20 degrees is less than 60, it may be inferior in image quality, and where it exceeds 110, it may be inferior in image quality such as development of metallic luster.

In this instance, the gloss level can be measured, for example, in accordance with JIS Z8741.

It is preferable that the toner image receiving layer is high in smoothness after fixation. Regarding the smoothness, an arithmetic average roughness (Ra) at an entire area from a white area where no toner is applied to a black area where the toner is applied at a maximum concentration is preferably 3 μm or less, more preferably 1 μm or less and in particular preferably 0.5 μm or less.

In this instance, the arithmetic average roughness can be measured, for example, in accordance with JIS B0601, JIS B0651, and JIS B0652.

The toner image receiving layer preferably has at least any one of the physical properties enlisted in the following items (1) to (6), more preferably has a plurality of the physical properties and in particular further preferably has all of the physical properties.

(1) Tm (melting temperature) of the toner image receiving layer is preferably 30° C. or more, and Tm plus 20° C. of toner or more is preferable.

(2) A temperature at which the viscosity of the toner image receiving layer exhibits $1\times10^5$ cp is preferably 40° C. or more, which is preferably lower than a temperature of the toner.

(3) The storage elastic modulus (G') of the toner image receiving layer at a fixing temperature is preferably $1\times10^2$ Pa to $1\times10^5$ Pa and the loss elastic modulus (G") is preferably $1\times10^2$ Pa to $1\times10^5$ Pa.

(4) The loss tangent (G"/G'), which is a ratio of loss elastic modulus (G") of the toner image receiving layer at a fixing temperature to storage elastic modulus (G') is preferably 0.01 to 10.

(5) The storage elastic modulus (G') of the toner image receiving layer at a fixing temperature is preferably −50 to +2,500 with respect to the storage elastic modulus (G') of toner at a fixing temperature.

(6) An inclination angle of melted toner on the toner image receiving layer is preferably 50° or less and more preferably 40° or less.

Further, the toner image receiving layer satisfying the physical properties described in Japanese Patent No. 2788358, JP-A No. 07-248637, JP-A No. 08-305067 and JP-A No. 10-239889 is preferable.

The surface electric resistance value of the toner image receiving layer is preferably $1\times10^6$ to $1\times10^{15}$ Ω/cm² at a temperature of 25° C. and a relative humidity of 65%. Where the surface electric resistance value is less than $1\times10^6$ Ω/cm², toner is not transferred in a sufficient quantity during transfer of toner to the toner image receiving layer, and the thus obtained toner image may be decreased in concentration. Where it exceeds $1\times10^{15}$ Ω/cm², an electric charge is developed in a quantity more than necessary during transfer to result in an insufficient transfer of the toner. Thereby, the image concentration is low, and a static electricity develops during the handling of the image receiving sheet for electrophotography to frequently result in attachment of dust. A wrong feed, multi-feed, electrical discharge mark and omitted toner transfer may occur during reproduction.

In accordance with JIS K6911, the surface electric resistance value can be obtained by subjecting the samples to moisture conditioning under a condition where the temperature is 20° C. and the RH is 65% for 8 hours or more, under the same condition, supplying electricity to the samples at an applied voltage of 100V and measuring the value after one minute by use of R8340 manufactured by Advantest Corporation.

<Other Layers>

Other layers on the image receiving sheet for electrophotography include, for example, a back layer, a surface-protective layer, an adhesiveness improving layer, a cushion layer, an electrostatic-charge preventive layer, a reflection layer, a color adjusting layer, a storage improving layer, an adhesion preventive layer, an anti-curl layer and a smoothing layer. These layers may be structured in a single layer or two or more laminated layers.

—Back Layer—

The back layer can be provided on a face in opposition to the side where the toner image receiving layer of a support is provided for the purpose of imparting the back-surface output adequacy and improving back-surface output image quality, curl balance and mechanical passage.

There are no particular restrictions on the color of the back layer, and any color may appropriately be selected according to the intended use. Where the image receiving sheet for electrophotography is of a both-face output type where an image is formed on the back surface as well, the back layer is preferably also white. The degree of whiteness and spectral reflectance on the back layer are preferably 85% or more, the same as the front surface.

Further, in order to improve the both-face output adequacy, the back layer may be constituted similarly as the toner image receiving layer. On the back layer, various types of additives described in the toner image receiving layer may be used. Of these additives, a matting agent and an electrostatic adjusting agent are preferable as the releasing agent. The back layer may be structured in a single layer or two or more laminated layers.

Further, where mold releasing oil is used in a fixing roller or the like for preventing offset on fixation, the back layer may be oil-absorptive.

The thickness of the back layer is usually preferably 0.1 μm to 10 μm.

—Surface-Protective Layer—

For the purpose of protecting the surface on the image receiving sheet for electrophotography, improving the storage and handling properties, imparting the writing property, improving the mechanical passage or imparting the anti-offset property, the surface-protective layer may be provided on the surface of the toner image receiving layer. The surface-protective layer may be structured in a single layer or two or more laminated layers.

The surface-protective layer may contain various types of thermoplastic resins and thermosetting resins as a binder. A resin similar to the toner image receiving layer is favorably used as the resins. It is noted that the thermodynamic properties and electrostatic properties are not needed to be similar to those of the toner image receiving layer and may be optimized individually.

On the surface-protective layer, various types of additives described in the toner image receiving layer may be used. Of these additives, a matting agent is preferable as the releasing agent. It is noted that the matting agent is selected from various known agents.

The outermost surface layer on the image receiving sheet for electrophotography (for example, the surface-protective layer or the like, where the surface-protective layer is formed) is preferably that which is well compatible with toner in view of the fixing property. More specifically, the contact angle with melted toner is preferably, for example, 0° to 40°.

—Adhesiveness Improving Layer—

The adhesiveness improving layer may be provided between the support and the toner image receiving layer for improving the adhesiveness of the support and the toner image receiving layer. In the adhesiveness improving layer, various types of additives as with those of the toner image receiving layer may be formulated, in particular, the formulated is preferably a crosslinking agent.

—Cushion Layer—

The cushion layer may be provided between the adhesiveness improving layer and the toner image receiving layer for improving the acceptability of toner.

There are no particular restrictions on the thickness of the image receiving sheet for electrophotography of the present invention, and any thickness may appropriately be selected according to the intended use. The thickness is preferably, for example, 50 μm to 550 μm and more preferably 100 μm to 350 μm.

<Toner>

The image receiving sheet for electrophotography of the present invention is used after toner is applied on the toner image receiving layer on printing or reproduction.

The toner contains at least a binding resin and a dye, and also contains a releasing agent and other components, if necessary.

—Binding Resin—

There are no particular restrictions on the binding resins, and any binding resin may appropriately be selected from those normally used in toner according to the intended use. The binding resins, include, for example, styrenes such as a styrene and parachlorostyrene; vinyl esters such as a vinyl naphthalene, vinyl chloride, vinyl bromide, vinyl fluoride, vinyl acetate, vinyl propionate, vinyl benzoate and vinyl acetate; methylene aliphatic series carboxylate esters such as methyl acrylate, ethyl acrylate, n-butyl acrylate, isobutyl acrylate, dodecyl acrylate, n-octyl acrylate, 2-chloroethyl acrylate, phenyl acrylate, methyl α-chloroacrylate, methyl methacrylate, ethyl methacrylate, and butyl methacrylate; vinyl nitrites such as acrylonitrile, methacrylnitrile, and acrylamide; vinyl ethers such as vinyl methyl ether, vinyl ethyl ether, and vinyl isopropyl ether; N-vinyl compounds such as N-viny pyrol, N-vinyl carbasole, N-vinyl indole and N-vinyl pyrrolidone; homopolymers of vinyl monomers such as vinyl carboxylic acids, for example, a methcrylic acid, acrylic acid and cinnamic acid, or their copolymers; and various types of polyesters. The binding resin may contain various types of waxes.

Of these substances, the binding resin is in particular preferably that which is the same resin used in the toner image receiving layer of the present invention.

—Dye—

There are no particular restrictions on dyes, and any dye may appropriately be selected from those usually used in toner according to the intended use. The dyes include, for example, pigments and dyes.

The pigments include carbon black, chrome yellow, hanza yellow, benzine yellow, suren yellow, quinoline yellow, permanent orange GTR, pyrazolone orange, vulcan orange, watch-young red, permanent red, brilliant carmin 3B, briliant carmin 6B, Dupont Oil Red, pyrazolone red, lithol red, rhodamine B lake, lake red C, rose bengal, anilin blue, ultramarine blue, carco oil blue, methylene blue chloride, phthalocyanine blue, phthalocyanine green, and malachite green oxylate.

The dyes include acridine, xanthene, azo, benzoquinone, azine, anthraquinone, thioindigo, dioxazine, thiazine, azomethine, indigo, thioindigo, phthalocyanine, aniline black, polymethine, triphenylmethane, diphenyl methane, thiazine, thiazole, and xanthene-based dyes. These substances may be used soley or in combination with two or more of them.

There are no particular restrictions on the content of the coloring agents, and any content may appropriately be selected according to the intended use. However, the content is preferably 2% by mass to 8% by mass. Where the content is less than 2% by mass, the staining power may be decreased. Where it exceeds 8% by mass, the transparency may be impaired.

—Releasing Agent—

There are no particular restrictions on the releasing agents, and any releasing agent may appropriately be selected from those usually used in toner according to the intended use. Preferable are, for example, high-crystalline polyethylene wax having a relatively low molecular weight, Fischer-Tropsch wax, amide wax, and nitrogen-containing polar wax such as compounds having urethane bonds.

There are no particular restrictions on the molecular weight of the polyethylene wax, and any molecular weight may appropriately be selected according to the intended use. The molecular weight is preferably 1,000 or less and more preferably 300 to 1,000.

The compounds having urethane bonds are preferable in that although lower in molecular weight, they are able to retain a solid state due to a coagulation force resulting from polar radicals and set to have a higher melting point for the molecular weight. The molecular weight of the compounds having urethane bonds is preferably 300 to 1,000. Materials of the compounds having urethane bonds may be selected from a combination of diisocyanate compounds with monoalcohols, a combination of monoisocyanic acid with a monoalcohol, a combination of dialcohols with monoisocyanic acid, a combination of trialcohols with monoisocyanic acid, a combination of triisocyanate compounds with monoalcohols and many other combinations. It is preferable in view of avoiding the formation of a high-molecular weight polymer that a polyfunctional compound is combined with a monofunctional compound. It is also important that these compounds are combined so as to make them equal in value.

The monoisocyanic acid compounds include, for example, dodecyl isocyanate, phenyl isocyanate or the derivative, naphthyl isocyanate, hexyl isocyanate, benzyl isocyanate, butyl isocyanate and allyl isocyanate.

The diisocyanate compounds include, for example, tolylene diisocyanate, diisocyanic acid 4,4' diphenyl methane, toluene diisocyanate, diisocyanic acid 1,3-phenylene, hexamethylene diisoyanate, diisocyanic acid 4-methyl-m-phenylene, and isophorone diisocyanate.

The monoalcohols include, for example, methanol, ethanol, propanol, butanol, pentanol, hexanol, and heptanol.

The dialcohols include a wide variety of glycols such as ethylene glycol, diethylene glycol, triethylene glycol and trimethylene glycol.

The trialcohols include trimethylol propane, triethylol propane and trimethanol ethane.

These urethane compounds are also usable as a mixing/crushing-type toner, like an ordinary releasing agent, by mixing with a resin and coloring agent during mixture and kneading. Further, where used in the emulsion polymerization coagulation melting toner, they are dispersed into water, together with an ionic surfactant and macromolecular electrolyte such as macromolecular acid and macromolecular base, heated to temperatures higher than a melting point, converted into fine particles, with a high shearing force applied, by using a homogenizer or a pressurized discharge type disperser to prepare a releasing agent particle dispersion with the diameter of 1 μm or less, which is used together with a resin particle dispersion, a dye dispersion and others.

—Other Components of Toner—

The toner may also contain other components such as an internal additive, an electrostatic adjusting agent and inorganic fine particles. The internal additive includes, for example, magnetic materials such as metals of ferrite, magnetite, reduced iron, cobalt, nickel and manganese, alloys, and compounds containing these metals.

The electrostatic adjusting agent includes, for example, a wide variety of ordinarily used electrostatic adjusting agents such as a dye composed of complexes of quaternary ammonium salt compound, nigrosine compound, aluminum, iron and chrome, and triphenylmethane based pigment. It is noted that low-water dispersible materials are preferable in view of the fact that the ionic strength which influences the stability on coagulation and melting can be controlled and waste-water pollution can be decreased.

All the materials which are usually used as an external additive on the surface of toner, for example, silica, alumina, titania, calcium carbonate, magnesium carbonate and tricalcium phosphate may be used as the inorganic fine particles. It is preferable that they are used after dispersion with an ionic surfactant, a macromolecular acid or a macromolecular base.

Further, a surfactant may be used for emulsion polymerization, seed polymerization, dispersion of pigments, dispersion of resin particles, dispersion of releasing agents, coagulation, and stabilization thereof. It is also effective in using in combination, for example, with anionic surfactants derived from sulfate ester, sulfonate, phosphate ester and soap, cationic surfactants derived from amine base and quaternary ammonium salt, and non-ionic surfactants derived from polyethylene glycol, alkylphenol ethylene oxide additive, and polyvalent alcohol. In this instance, the surfactants can be dispersed by using a common device such as a ball mill, sand mill and dinomill having a rotational shearing-type homogenizer or medium.

It is noted that an external additive may also be added to the toner, if necessary. The external additive is classified into inorganic particles and organic particles.

The inorganic particles include, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$ and $MgSO_4$.

The organic particles include, for example, fatty acids and derivatives, powders of metal salts, and fluorinated resin powders, polyethylene resin and acryl resin.

The average particle diameter of the external additive is preferably 0.01 μm to 5 μm and more preferably 0.1 μm to 2 μm.

There are no particular restrictions on a production method of the toner, and any method may appropriately be selected according to the intended use. It is, however, preferable that the method includes the steps of (i) forming coagulation particles in a dispersion prepared by dispersing resin particles to prepare a coagulation particle dispersion, (ii) adding and mixing a fine particle dispersion prepared by dispersing fine particles in the coagulation particle dispersion to allow the fine particles to attach to the coagulation particles, thereby forming attached particles, and (iii) heating and melting the attached particles to form toner particles.

[Physical Properties of Toner and Others]

The volume average particle diameter of the toner is preferably 0.5 μm to 10 μm. Where the volume average particle diameter is less than 0.5 μm, the toner may adversely be affected by handling (supply property, cleaning property, fluidity and others) or decreased in productivity of particles. Where it exceeds 10 μm, the toner may adversely affect the image quality and resolution resulting from graininess and transfer properties.

Further, it is preferable that the toner satisfies the above-described volume average particle diameter range and the volume average grain size distribution value (GSDv) is 1.3 or less.

The ratio of the volume average grain size distribution value (GSDv) of the toner to the number average grain size distribution (GSDn), that is (GSDv/GSDn) is preferably 0.95 or more.

Further, it is preferable that the toner satisfies the above-described volume average particle diameter range and the average value of the shape factor expressed by the following formula is 1.00 to 1.50.

$$\text{Shape factor}=(\pi\times L^2)/(4\times S)$$

In the formula, L denotes a maximum length of toner particle and S denotes a projected area of the toner particle.

Where the toner satisfies the above conditions, there is an effect on image quality, especially graininess and resolution. Omission and blur related to transfer properties are less likely to develop, and handling is not affected even when the average particle diameter is not small.

The storage elastic modulus G' (measured at angular frequency of 10 rad/sec) of the toner itself at 150° C., which is $1\times10^2$ Pa to $1\times10^5$ Pa is appropriate both in terms of improvement in image quality and prevention of offset property at the fixation step.

<<Thermosensitive Recording Sheet>>

The thermosensitive recording sheet includes, for example, a thermosensitive recording sheet which is constituted so as to have at least a thermal color developing layer as the image recording layer on the support and used in a thermo-autochrome method (TA method) for forming an image by repeating heating by a thermal head and fixation by ultraviolet ray.

<<Sublimation Transfer Recording Sheet>>

The sublimation transfer recording sheet includes, for example, a sublimation transfer recording sheet which is constituted so as to have at least an ink layer containing a thermally diffusive dye (sublimation dye) as the image recording layer on the support and used in a sublimation transfer method for heating by a thermal head to transfer the thermally diffusive dye from the ink layer to a sublimation transfer sheet.

<<Thermal Transfer Recording Sheet>>

The thermal transfer recording sheet includes, for example, a thermal transfer recording sheet which is constituted so as to have at least a thermofusible ink layer as the image recording layer on the support and used in a method for heating by a thermal head to melt and transfer ink from a thermofusible ink layer to a thermal transfer sheet.

<<Recording Sheet for Silver Halide Photography>>

The recording sheet for silver halide photography includes, for example, a recording sheet for silver halide photography which is constituted so as to have on the support an emulsion layer which develops color on YMC as the image recording layer and used in a silver-halide photographic method for coloring/developing, breaching/fixing, water washing, and drying by allowing a printed and exposed silver-halide photographic recording sheet to pass while submerged in a plurality of treatment tanks.

<<Inkjet Recording Material>>

The inkjet recording material includes, for example, an inkjet recording material which has at least on the support an ink receiving layer as the image recording layer capable of receiving liquid ink such as water-based ink (a dye or a pigment is used as a coloring material) and solvent ink or solid ink which is a solid at normal temperatures and melted and liquefied when used for printing.

Since image recording materials of the present invention are excellent in toner-low temperature fixing property, adhesion resistance and peeling property from a fixing device and also capable of forming a highly-glossy and high-quality image, they can be used satisfactorily as an image receiving sheet for electrophotography, a thermosensitive recording sheet, a sublimation transfer recording sheet, a thermal transfer recording sheet, a sheet for silver halide photography, an inkjet recording sheet and others.

(Method for Producing Image Recording Materials)

The method for producing an image recording materials of the present invention is a method for producing the above-described image recording materials of the present invention which includes an image recording layer forming step of coating on a support a coating solution for image recording layer containing a crystalline polymer and an amorphous polymer and drying the resultant to form an image recording layer and also other steps, if necessary.

—Image Recording Layer Forming Step—

The image recording layer forming step is a step of forming the image recording layer on a support. More specifically, the image recording layer forming step is a step of coating on a support a coating solution for image recording layer containing a crystalline polymer and an amorphous polymer and drying the resultant to form an image recording layer.

There are no particular restrictions on the coating method, and any method may appropriately be selected according to the intended use. The method includes, for example, a bar coating method, a spin coating method, a dip coating method, a kneader coating method, a curtain coating method, and a blade coating method. Of these methods, the spin coating method and the dip coating method are preferable in view of coating efficiency.

There are no particular restrictions on a coating quantity of the coating solution for image recording layer, and any quantity may appropriately be selected according to the intended use. The quantity is preferably 1 $g/m^2$ to 20 $g/m^2$ on a dry solid content basis and more preferably 4 $g/m^2$ to 15 $g/m^2$. Where the coating quantity is out of the preferable range, the image recording layer with a desired thickness may not be obtained.

There are no particular restrictions on the drying method, and any method may appropriately be selected according to the intended use. The drying is preferably conducted at temperatures of 60° C. to 120° C. for 10 seconds or more and more preferably at temperatures of 70° C. to 100° C. for 10 seconds to 3 minutes.

—Other Steps—

There are no particular restrictions on other steps, and any step may appropriately be selected according to the intended use. The other steps include, for example, a step of forming an intermediate layer and other layers.

It is noted that the step of forming the other layers can be conducted under conditions similar to those of the step of forming the image recording material.

According to the method for producing an image recording material of the present invention, it is possible to effectively manufacture the image recording material of the present invention.

(Image Forming Method)

The image-forming method of the present invention is a method for forming an image on the image receiving sheet for electrophotography, which is one of the image recording materials of the present invention, including a toner-image forming step, an image-surface smoothing and fixing step and other steps, if necessary.

—Toner Image Forming Step—

The toner image forming step is a step of forming a toner image on the image receiving sheet for electrophotography of the present invention.

There are no particular restrictions on the toner image forming step, as long as it is able to form a toner image on an image receiving sheet for electrophotography, and any step may appropriately be selected according to the intended use. The step includes a mode used in ordinary electrophotography, for example, a direct transfer mode for transferring a toner image formed on a development roller to an image receiving sheet for electrophotography and an intermediate transfer belt mode for transferring a toner image to the image receiving sheet for electrophotography after temporarily being transferred to an intermediate transfer belt and others. Among these, the intermediate transfer belt mode is preferable in view of environmental stability and attaining a high image quality.

—Image Surface Smoothing and Fixing Step—

The image surface smoothing and fixing step is a step of smoothing the surface of a toner image by the toner image forming step. More specifically, in the image surface smoothing and fixing step, a toner image formed by using an image surface smoothing and fixing device having a heating and pressurizing member, a belt member and a cooling device in forming the toner image is subjected to heating and pressurization, cooled and then peeled off.

There are no particular restrictions on the image surface smoothing and fixing device, and any processor may appropriately be selected according to the intended use. The processor includes, for example, that having a heating and pressurizing member, a belt member, a cooling device, a cooling/peeling portion and other members, if necessary.

There are no particular restrictions on the heating and pressurizing member, and any member may appropriately be selected according to the intended use. The member includes, for example, a pair of heating rollers and a combination of a heating roller and a pressure roller.

There are no particular restrictions on the cooling device, and any device may appropriately be used according to the intended use. The cooling device includes, for example, a heat sink, or a cooling device capable of feeding cold air to adjust the cooling temperature and others.

There are no particular restrictions on the cooling/peeling portion, and any portion may appropriately be selected according to the intended use. The cooling/peeling portion includes, for example, a tension-roll vicinity position, which peels from the belt due to the rigidity (stiffness) of an image receiving sheet for electrophotography in itself.

It is preferable to apply a pressure when the toner image is brought into contact with the heating and pressurizing member of the image surface smoothing and fixing device. There are no particular restrictions on the method for applying a pressure, and any pressure may appropriately be selected according to the intended use, however, a method using nip pressure is preferable. The level of the nip pressure is preferably 1 $kgf/cm^2$ to 100 $kgf/cm^2$ and more preferably 5 $kgf/cm^2$ to 30 $kgf/cm^2$ in view of forming an image excellent in water resistance and surface smoothness and favorable in gloss. Further, the heating and pressurizing member may be heated at any temperature exceeding a softening point of a polymer for the toner image receiving layer. The temperature is preferably 80° C. to 200° C., although it varies depending on the types of polymers for the toner image receiving layer. The cooling temperature of the cooling device is preferably 80° C. or less at which the toner image receiving layer is sufficiently solidified and more preferably 20° C. to 80° C.

The belt member includes a support film and a mold releasing layer formed on the support film.

There are no particular restrictions on materials of the support film as long as they are provided with heat resistance, and any material may appropriately be selected according to the intended use. The materials include, for example, polyimide (PI), polyethylene naphthalate (PEN), polyethylene terephthalate (PET), polyether ether ketone (PEEK), polyether sulphon (PES), polyetherimide (PEI), and polyparabanic acid (PPA).

It is preferable that the mold releasing layer contains at least any one of those selected from silicone rubber, fluorine rubber, fluorocarbon siloxane rubber, silicone resin and fluorine resin. Of these substances, preferable are an aspect in which a layer containing fluorocarbon siloxane rubber is provided on the surface of a belt member and that in which a silicone-rubber containing layer is provided on the surface of the belt member and the layer containing fluorocarbon siloxane rubber is provided on the surface of the silicone-rubber containing layer.

It is preferable that the fluorocarbon siloxane rubber has at least either a perfluoro alkylether group or a perfluoro alkyl group on the main chain.

The fluorocarbon siloxane rubber is preferably a cured substance of a fluorocarbon siloxane rubber composition having the following (A) to (D).

(A) Fluorocarbon polymer mainly consisting of fluorocarbon siloxane expressed by the following General Formula (1) and also having an aliphatic unsaturated group, (B) At least either organopoly siloxane or fluorocarbon siloxane which contains two or more of ≡SiH groups in one molecule and the content of the ≡SiH group is 1 to 4 time-molar quantities with respect to the content of aliphatic unsaturated group in the fluorocarbon siloxane rubber composition, (C) Filler, and (D) Catalyst in an effective quantity Fluorocarbon polymers of the (A) component include those mainly consisting of fluorocarbon siloxane having the repeating unit given by the following formula (1) and also having an aliphatic unsaturated group.

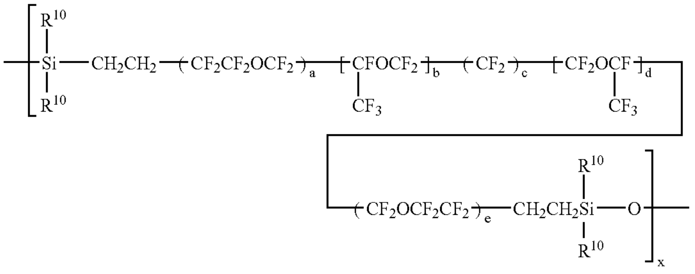

In the General Formula (1), $R^{10}$ denotes an unsubstituted monovalent hydrocarbon group or a substituted monovalent hydrocarbon group having 1 to 8 carbon atoms. In this instance, preferable are an alkyl group having 1 to 8 carbon atoms and an alkenyl group having 2 to 3 carbon atoms, and more preferable is a methyl group.

Further, "a" and "e" denote respectively an integer of 0 or 1. Still further, "b" and "d" denote respectively an integer of 1 to 4, and "c" denotes an integer of 0 to 8. In addition, "x" denotes an integer of 1 or more, preferably an integer of 10 to 30.

The (A) component includes, for example, those described in the following General Formula (2).

General Formula (2)

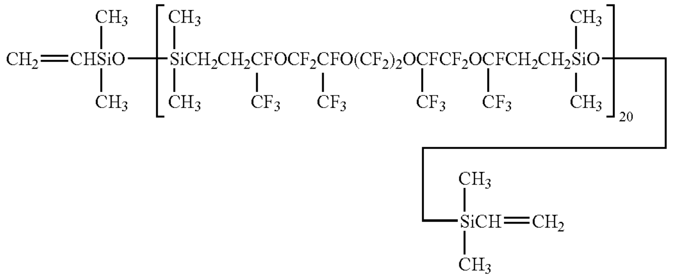

In the (B) component, the organopoly siloxane which contains ≡SiH group includes organohydrogen polysiloxane having in a molecule at least two hydrogen atoms bonded to a silicon atom.

Further, in the fluorocarbon siloxane rubber composition, where a fluorocarbon polymer of the (A) component has an aliphatic unsaturated group, it is preferable to use the above organohydrogen polysiloxane as a curing agent. In other words, a cured substance is formed through addition reaction of an aliphatic unsaturated group in the fluorocarbon siloxane with hydrogen atoms bonded to silicon atom in the organohydrogen polysiloxane.

The organohydrogen polysiloxane includes various types of organohydrogen polysiloxanes used in an addition-curing type silicone rubber composition.

The organohydrogen polysiloxane is preferably such that in which the number of ≡SiH groups thereof is generally at least one with respect to one aliphatic unsaturated hydrocar bon radical in fluorocarbon siloxane of the (A) component, and more preferably such that in which ≡SiH groups are formulated so that the number is 1 to 5.

Fluorocarbons having ≡SiH group are preferably those in which in units given in the above General Formula (1) or the above General Formula (1), $R^{10}$ is a dialkyl hydrogen siloxy group and also the terminal is ≡SiH group of dialkyl hydrogen siloxy group, silyl group or others, including those expressed by the following General Formula (3).

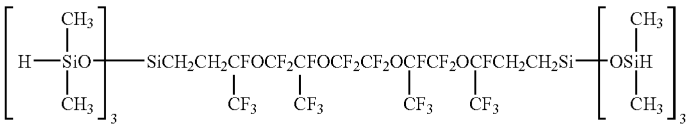

Various types of fillers used in a general silicone rubber composition may be used as a filler of the (C) component. The filler includes, for example, reinforcing fillers such as aerosol silica, sedimentary silica, carbon powder, titanium dioxide, aluminum oxide, quartz powder, talc, sericite and pentonite; and fibrous fillers such as asbesstos, glass fiber and organic fiber.

Catalysts of the (D) component are preferably chloroplatinic acid which has been known as a catalyst for addition reaction, alcohol modified chloroplatinic acid, a complex of chloroplatinic acid and olefin, those in which platinum black or palladium is supported on carriers such as alumina, silica and carbon, a complex of rhodium with olefin, elements of periodic table VIII group such as chlorotris (triphenyl phosphine), rhodium (Wilkinson catalyst), rhodium (III) acetylacetonate and the compounds. These complexes are preferably used by dissolving in solvents such as an alcohol compound, an ether compound and a hydrocarbon compound.

There are no particular restrictions on the fluorocarbon siloxane rubber composition, and any composition may appropriately be used according to the intended use. Various types of compounding agents may be added. The compounding agents include, for example, dispersing agents such as diphenylsilanediol, low-polymerized molecular chain terminal hydroxyl group hindered dimethylpolysiloxane and hexamethyldisilazane; heat-resistance improving agents such as ferrous oxide, ferric oxide, ceric oxide and iron octylate; and dyes such as pigments.

The method for providing on the surface of the support film a layer containing the fluorocarbon siloxane rubber includes, for example, a method for coating the surface of the support with the fluorocarbon siloxane rubber composition and heating and curing. There are no particular restrictions on the coating method, and any coating method may appropriately be selected according to the intended use. The coating method includes, for example, a method for diluting the fluorocarbon siloxane rubber composition in a solvent such as m-xylene hexafluoride and benzotrifluoride to prepare a coating solution and coating the coating solution by using a general coating method such as spray coating, dip coating, or knife coating. Further, there are no particular restrictions on the heating/curing conditions, and any conditions may appropriately be selected, depending on the type and the support film, the production method and others. The heating and curing are performed, for example, at temperatures of 100° C. to 500° C. for 5 seconds to 5 hours.

There are no particular restrictions on the thickness of a mold releasing layer to be formed on the surface of the support film. The thickness is preferably 1 μm to 200 μm and more preferably 5 μm to 150 μm in view of the fact that images with favorable fixing property are obtained by preventing the peeling property of toner or offset of toner components.

Figure 3:
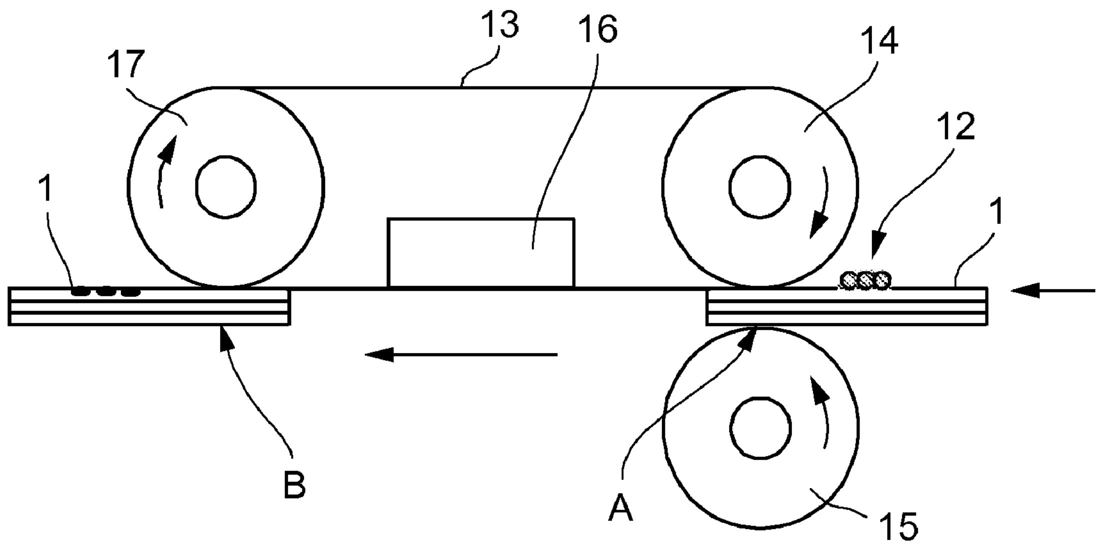
FIG. 3 is a schematic diagram showing one example of an image surface smoothing and fixing device used in the present invention.

Here, a specific description will be made for one example of a belt fixing device of the image forming apparatus of the present invention with reference to FIG. 3.

First, toner 12 is transferred to an image receiving sheet for electrophotography 1 by the image forming apparatus (not illustrated). The image receiving sheet for electrophotography 1 on which the toner 12 is attached is transported to Point A by transport equipment (not illustrated), passed through a space between a heating roller 14 and a pressure roller 15, and subjected to heating and pressurizing at a temperature (fixing temperature) and pressure at which a toner image receiving layer of the image receiving sheet for electrophotography 1 or the toner 12 are sufficiently softened.

In this instance, the "fixing temperature" is defined as a temperature on the surface of the toner image receiving layer measured at the heating roller 14, the pressure roller 15 and the nip portion on the Point A. The fixing temperature is preferably, for example, 80° C. to 190° C. and more preferably 100° C. to 170° C. Further, the "pressure" is defined as a pressure on the surface of the toner image receiving layer measured at the heating roller 14, the pressure roller 15 and the nip portion. The pressure is preferably, for example, 1 $kgf/cm^2$ to 10 $kgf/cm^2$ and more preferably 2 $kgf/cm^2$ to 7 $kgf/cm^2$.

The image receiving sheet for electrophotography 1 is subjected to heating and pressing as described above and then transported to a cooling device 16 by a fixing belt 13, during which a releasing agent (not illustrated) exists in a dispersed manner inside the toner image receiving layer is sufficiently heated and melted and moved to the surface of the toner image receiving layer. The thus moved releasing agent forms a layer (film) of the releasing agent on the surface of the toner image receiving layer. Thereafter, the image receiving sheet for electrophotography 1 is transported by the fixing belt 13 to the cooling device 16 and cooled to a temperature or less than a softening point of a binder resin used, for example, either polymer or toner of the toner image receiving layer or to a temperature of glass transition temperature+10° C. or less, preferably 20° C. to 80° C. and further preferably to room temperature (25° C.). Thereby, the layer (film) of the releasing agent formed on the surface of the toner image receiving layer is cooled and solidified to form a releasing agent layer.

The thus cooled image receiving sheet for electrophotography 1 is further transported by the fixing belt 13 to Point B, and the fixing belt 13 moves on a tension roller 17. Therefore, the image receiving sheet for electrophotography 1 is peeled off from the fixing belt 13 on the Point B. It is preferable that the tension roller is designed to be small in diameter so that the image receiving sheet for electrophotography can be peeled off from the belt by its own rigidity (stiffness).

Figure 4:
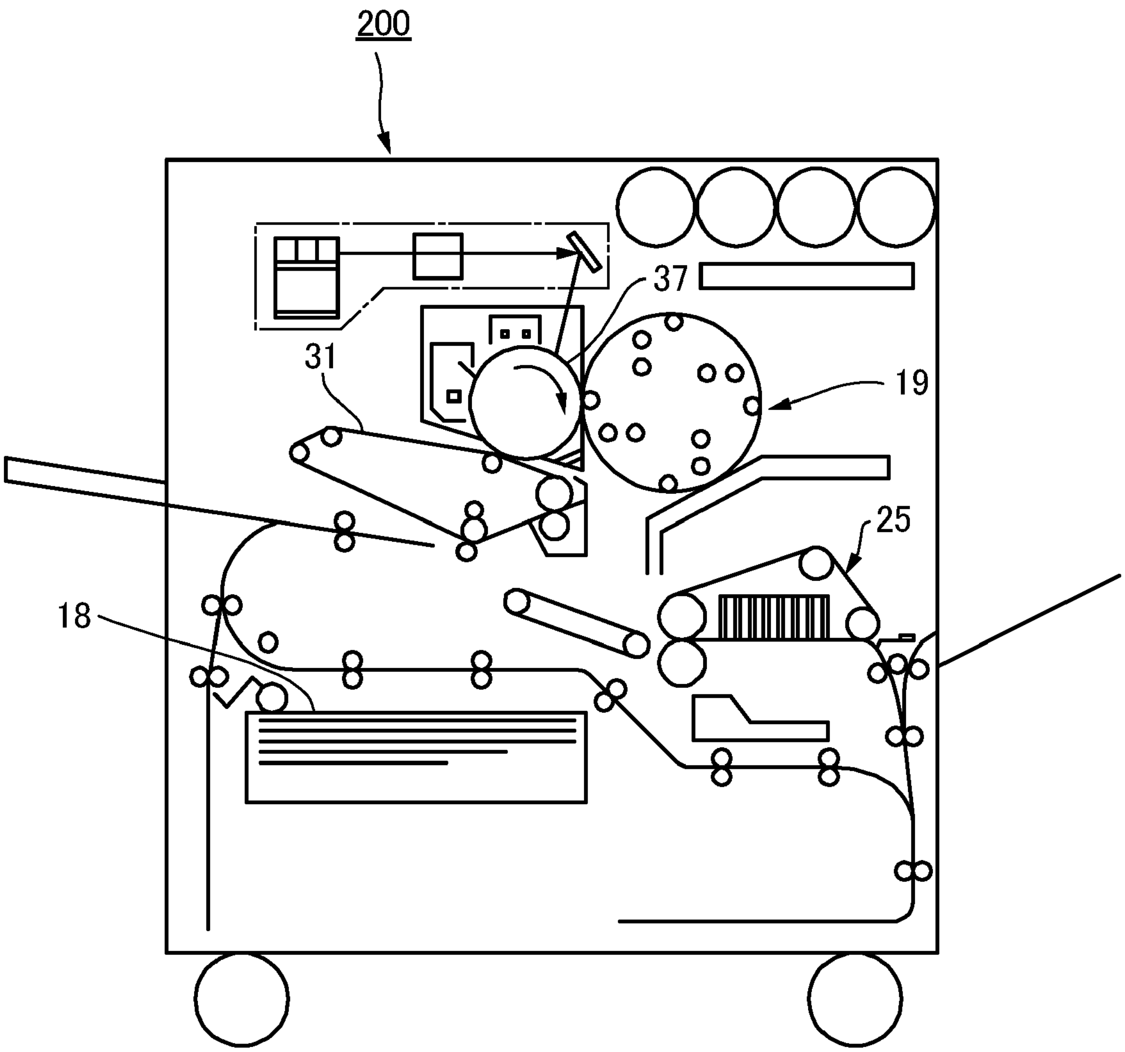
FIG. 4 is a schematic diagram showing one example of an image forming apparatus used in the present invention.
Figure 5:
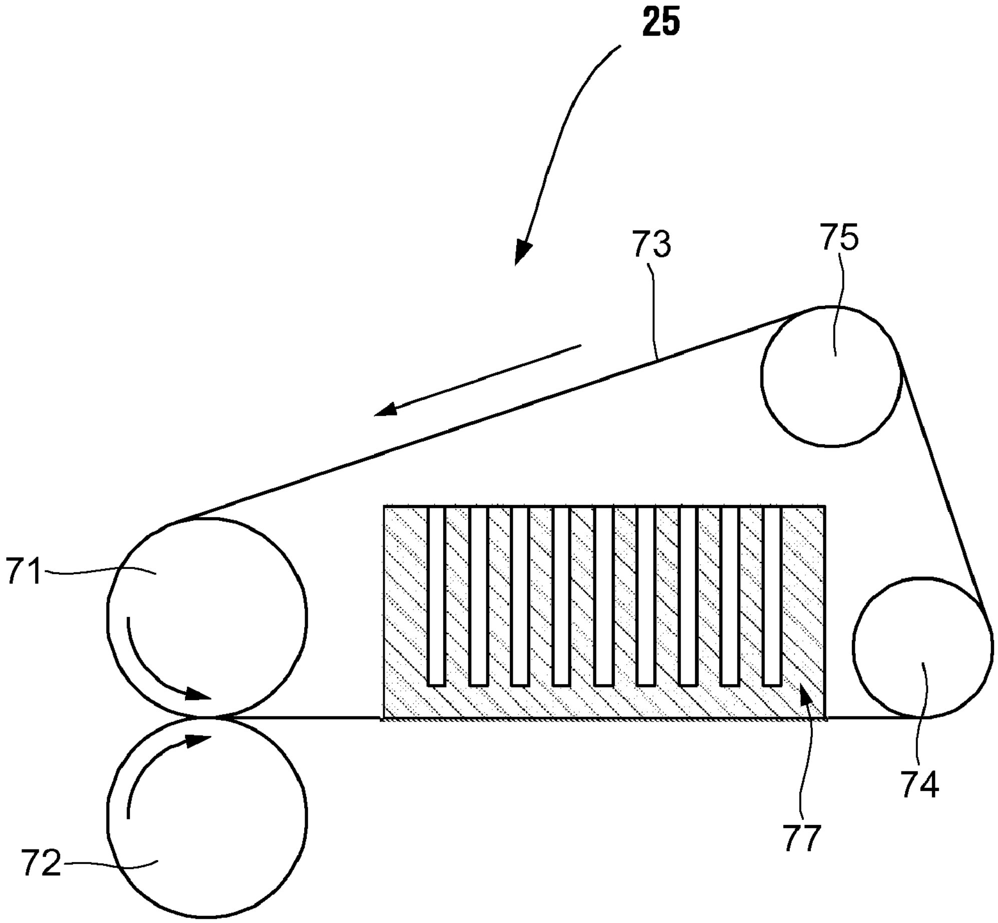
FIG. 5 is a schematic diagram showing one example of the image surface smoothing and fixing device of the image forming apparatus shown in FIG. 4.

Further, the image surface smoothing and fixing device shown in FIG. 5 may be that which is, for example, a modified fixing portion of the image forming apparatus shown in FIG. 4 (full-color laser printer, DCC-500, manufactured by Fuji Xerox Co., Ltd.).

The image forming apparatus 200 shown in FIG. 4 is equipped with a photosensitive drum 37, a development device 19, an intermediate transfer belt 31, an image receiving sheet for electrophotography 18 and a fixing portion (image surface smoothing and fixing device) 25.

FIG. 5 shows the fixing portion (image surface smoothing and fixing device) 25 disposed inside the image forming apparatus 200 given in FIG. 4.

As shown in FIG. 5, the image surface smoothing and fixing device 25 is provided with a heating roll 71, a peeling roller 74 including the heating roll 71, an endless belt 73 supported by a tension roll 75 so as to move rotationally and a pressure roller 72 brought into contact under pressure with the heating roller 71 via the endless belt 73.

Further, a cooling heat sink 77 for forcibly cooling the endless belt 73 is disposed between the heating roller 71 and the peeling roller 74 on the inner face of the endless belt 73. The cooling heat sink 77 constitutes a cooling/sheet transport portion for cooling an image receiving sheet for electrophotography and transporting the sheet.

Then, as shown in FIG. 5, in the image surface smoothing and fixing device 25, a color toner image is transferred on the surface, and a fixed electrophotographic transfer sheet is introduced to the heating roller 71 and a pressure contact portion (nip portion) with the pressure roller 72 brought into contact under pressure with the heating roller 71 via the endless belt 73 in such a way that a color toner image is positioned on the heating roller 71 and passed through the pressure contact portion between the above heating roller 71 and the pressure roller 72, during which the color toner image is heated, melted on the image receiving sheet for electrophotography and then fixed.

Thereafter, at the pressure contact portion between the heating roller 71 and the pressure roller 72, for example, toner is heated substantially to temperatures of about 120° C. to 130° C., and melted. Then, the image receiving sheet for electrophotography in which the color toner image is fixed on the toner image receiving layer is transported, together with the endless belt 73, with the toner image receiving layer thereon being firmly attached to the surface of the endless belt 73. In the meantime, the above endless belt 73 is forcibly cooled by the cooling heat sink 77, and after the color toner image and the toner image receiving layer are cooled and solidified, the image receiving sheet for electrophotography is peeled off by the peeling roller 74 due to its own stiffness (rigidity).

It is noted that the surface of the endless belt 73 after completion of the peeling step from which residual toner and others are removed by a cleaner (not illustrated) is ready for a subsequent image surface smoothing/fixation treatment step.

The image forming method of the present invention is not only able to feed paper stably but also able to form a highly glossy and high-quality image excellent in fixing-device passing performance.

According to the present invention, it is possible to provide favorable image recording material as an image receiving sheet for electrophotography, a method for effectively producing the same and a method for forming an image favorable in fixing-device passing performance by using the image recording material, capable of solving conventional problems, forming a highly glossy and high-quality image excellent in low temperature fixing property, adhesion resistance and peeling property from a fixing device.

EXAMPLES

Hereinafter, the present invention will be further described in detail referring to specific Examples, however, the present invention is not limited to the disclosed Examples.

<Preparation of Support>

—Preparation of Raw Paper—

A broad-leaf bleached kraft pulp (LBKP) was beaten to 340 mL (Canadian standard freeness of pulp, C.S.F.) by using a conical refiner to provide pulp having an average fiber length of 0.63 mm.

Three parts by mass of water-swelling sodium carboxymethyl cellulose (degree of etherification: 0.25, average particle diameter: 20 μm) was added to 100 parts by mass of the pulp, and the resultant was mixed and dispersed.

Then, the following substances were added so as to give the following percentages on the basis of pulp mass, that is, cationic starch, 1.0% by mass; alkyl ketene dimer (AKD) as a sizing agent, 0.5% by mass; anion polyacrylamide, 0.2% by mass; and polyamidepolyamine epichlorohydrin, 0.3% by mass. It is noted that the alkyl part of the alkyl ketene dimer is derived from fatty acid mainly based on behenic acid.

A raw paper with the basis weight of 160 $g/m^2$ was made with the thus prepared pulp paper stock by using a paper making machine.

Further, a size press machine was used to attach 1.2 $g/m^2$ Of carboxy-modified polyvinyl alcohol and 0.7 $g/m^2$ of $CaCl_2$ to the front surface of raw paper (surface on the toner image receiving layer) at the middle part of a drying zone in a Fourdrinier machine.

At the last stage of the Fourdrinier machine, soft calendar treatment (metal roll surface temperature on the front surface, 120° C.; resin roll surface temperature on the back surface 50° C.) was conducted to adjust the density to 0.98 $g/cm^3$.

—Preparation of Support A—

After the thus prepared raw paper was treated by corona discharge at an output of 17 kW, polyethylene resin having the compositions shown at Formulation a on Table 2 below was laminated on the back surface by using a cooling roll with a surface mat roughness of 10 μm at a melting/discharging film temperature of 320° C. at a line speed of 250 m/min in a single-layer extrusion, thereby forming a back-surface polyethylene resin layer with a thickness of 20 μm.

Then, polyethylene resin and titanium oxide subjected to master batch shown in Table 3 were melted and mixed at the ratio shown in Formulation b of Table 2 and laminated on the front surface of raw paper or, the side on which a toner image receiving layer is coated, by using a cooling roll with a surface mat roughness of 0.7 μm at a melting/discharging film temperature of 320° C. at a line speed of 250 m/min in a single-layer extrusion, thereby forming a front surface polyethylene resin layer with a thickness of 30 μm.

After the front surface and the back surface were treated by corona discharge at the respective outputs of 18 kW and 12 kW, a gelatin primer layer of 0.06 $g/m^2$ on a dry solid content basis was formed on the front surface, whereas a back-surface layer containing Snowtex (Nissan Chemical Industries Ltd.), alumina sol and polyvinyl alcohol at the respective quantities of 0.075 $g/m^2$, 0.038 $g/m^2$ and 0.001 $g/m^2$ was formed on the back surface, thereby providing a support A.

TABLE 2

| | Physical values of resin | | Content (% by mass) | |
|---|---|---|---|---|
| | MFR | Density | | |
| | g/10 min | $g/cm^3$ | Formulation a | Formulation b |
| HDPE | 15 | 0.968 | 55 | — |
| LDPE | 3.5 | 0.924 | 45 | 70 |
| Titanium oxide | — | — | — | 30 |

TABLE 2-continued

| | Physical values of resin | | | |
|---|---|---|---|---|
| | MFR | Density | Content (% by mass) | |
| | g/10 min | g/cm$^3$ | Formulation a | Formulation b |
| subjected to master batch Average density of resin (g/cm$^3$) | — | — | 0.948 | 0.924 |

TABLE 3

| | Content (% by mass) |
|---|---|
| LDPE (density ρ = 0.921 g/cm$^3$) | 37.98 |
| Anatase-type titanium dioxide | 60 |
| Zinc stearate | 2 |
| Antioxidant | 0.02 |

Synthesis Example 1

Synthesis of Crystalline Polyester Resin (P-1)

First, 253.6 g of dodecanedioic acid, 95.2 g of ethylene glycol, 0.7 g of trimethylol propane and 0.11 g of tetra-n-butyltitanate were placed into a heat- and pressure-resistant glass container equipped with an agitator and heated at 235° C. for three hours to conduct an esterification reaction. Then, the system was gradually decreased in pressure to 13 Pa one hour later and supplied with nitrogen gas to return the pressure to a normal pressure three hours later. Then, 10.4 g of anhydrous trimellitic acid was added thereto and agitated for 1.5 hours to conduct a depolymerization reaction, thereby synthesizing a crystalline polyester resin (P-1).

Synthesis Example 2

Synthesis of Crystalline Polyester Resin (P-2)

First, 65.2 g of sebacic acid, 107.9 g of anhydrous succinic acid, 175.8 g of 1,4-butane diol, 11.0 g of trimethylol propane and 0.14 g of tetra-n-butyltitanate were placed into a heat- and pressure-resistant glass container equipped with an agitator and heated at 235° C. for three hours to conduct an esterification reaction. Then, the system was gradually decreased in pressure to 13 Pa one hour later and supplied with nitrogen gas to return the pressure to a normal pressure three hours later. Then, 9.9 g of anhydrous trimellitic acid was added thereto and agitated for 1.5 hours to conduct a depolymerization reaction, thereby synthesizing a crystalline polyester resin (P-2).

Synthesis Example 3

Synthesis of Crystalline Polyester Resin (P-3)

First, 253.6 g of dodecanedioic acid, 95.2 g of ethylene glycol and 0.12 g of tetra-n-butyltitanate were placed into a heat- and pressure-resistant glass container equipped with an agitator and heated at 235° C. for three hours to conduct an esterification reaction. Then, the system was gradually decreased in pressure to 13 Pa one hour later and supplied with nitrogen gas to return the pressure to a normal pressure three hours later. Then, 9.9 g of anhydrous trimellitic acid was added thereto and agitated for 1.5 hours to conduct a depolymerization reaction, thereby synthesizing a crystalline polyester resin (P-3).

Synthesis Example 4

Synthesis of Amorphous Polyester Resin (P-4)

First, 166.0 g of terephthalic acid, 36.0 g of ethylene glycol, 48.9 g of neopentyl glycol and 94.8 g of bisphenol A ethyleneoxide adduct were placed into a heat- and pressure-resistant glass container equipped with an agitator and heated at 260° C. for four hours to conduct an esterification reaction. Then, 79 mg of antimony trioxide and 49 mg of triethyl phosphate were added as a catalyst to increase the temperature of the system to 280° C., and the system was gradually decreased in pressure to 13 Pa one hour later. After polymerization reaction for two hours, the system was supplied with nitrogen gas to return the pressure to a normal pressure. Then, the temperature of the system was decreased to 250° C., and 8.5 g of isophthalic acid was added thereto and agitated for two hours to conduct a depolymerization reaction, thereby synthesizing an amorphous polyester resin (P-4).

Synthesis Example 5

Synthesis of Amorphous Polyester Resin (P-5)

First, 99.6 g of terephthalic acid, 41.5 g of isophthalic acid, 21.9 g of adipic acid, 31.0 g of ethylene glycol and 88.4 g of neopentyl glycol were placed into a heat- and pressure-resistant glass container equipped with an agitator and heated at 260° C. for four hours to conduct an esterification reaction. Then, 79 mg of antimony trioxide and 49 mg of triethyl phosphate were added as a catalyst to increase the temperature of the system to 280° C., and the system was gradually decreased in pressure to 13 Pa one hour later. After a polymerization reaction for two hours, the system was supplied with nitrogen gas to return the pressure to a normal pressure. Then, the temperature of the system was decreased to 250° C., and 5.25 g of anhydrous trimellitic acid was added thereto and agitated for two hours to conduct a depolymerization reaction, thereby synthesizing an amorphous polyester resin (P-5).

Synthesis Example 6

Synthesis of Amorphous Polyester Resin (P-6)

First, 116.2 g of terephthalic acid, 49.8 g of isophthalic acid, 49.6 g of ethylene glycol and 57.2 g of neopentyl glycol were placed into a heat- and pressure-resistant glass container equipped with an agitator and heated at 260° C. for four hours to conduct an esterification reaction. Then, 79 mg of antimony trioxide and 49 mg of triethyl phosphate were added as a catalyst to increase the temperature of the system to 280° C., and the system was gradually decreased in pressure to 13 Pa one hour later. After a polymerization reaction for two hours, the system was supplied with nitrogen gas to return the pressure to a normal pressure. Then, the temperature of the system was decreased to 250° C., and 5.8 g of isophthalic acid was added thereto and agitated for two hours to conduct a depolymerization reaction, thereby synthesizing an amorphous polyester resin (P-6).

The thus obtained crystalline polyester resins (P-1 to P-3) and amorphous polyester resins (P-4 to P-6) were evaluated for various properties as follows. The results are shown in Table 4.

(1) Constitution of Polyester Resins

The constitution of polyester resins were determined by an $^1$H-NMR analyzer (300 MHz, manufactured by Varian Inc.).

(2) Number-Average Molecular Mass of the Polyester Resins

The number average molecular mass of the polyester resins were determined by gel permeation analysis (a liquid-feeding unit, LC-10Advp-type and an ultraviolet/visible spectrophotometer, SPD-6AV type, manufactured by Shimadzu Corporation were used to detect a wavelength of 254 nm by using a solvent of tetrahydrofuran on the basis of polystyrene conversion).

(3) Acid Value of Polyester Resins

First, 0.5 g of polyester resin was dissolved in 50 mL of water/dioxane (1:9 on volume ratio), and KOH was used to conduct titration, with cresol red used as an indicator, and a quantity of KOH consumed for neutralization in terms of mg/L was converted to a value per gram of polyester resin, which was defined as an acid value.

(4) Melting Point of Polyester Resins

In this instance, 10 mg of polyester resin was taken as a sample, a differential scanning calorimeter (DSC) (DSC-7 manufactured by Perkin Elmer Japan Co., Ltd.) was used to measure peaks at a temperature-increasing speed of 20° C./min, and, of the peaks derived from obtained crystals, the highest peak during the temperature increase was defined as the melting point of the polyester resin.

TABLE 4

| Component | | Crystalline polyester resin | | | Amorphous polyester resin | | |
|---|---|---|---|---|---|---|---|
| (mole ratio) | | P-1 | P-2 | P-3 | P-4 | P-5 | P-6 |
| Acid component | DDA | 100 | — | 100 | — | — | — |
| | SEA | — | 23 | — | — | — | — |
| | SUA | — | 77 | — | — | — | — |
| | TPA | — | — | — | 100 | 60 | 70 |
| | IPA | — | — | — | — | 25 | 30 |
| | ADA | — | — | — | — | 15 | — |
| | Total | 100 | 100 | 100 | 100 | 100 | 100 |
| Alcohol component | EG | 99.5 | — | 100 | 35 | 30 | 55 |
| | BD | — | 99.5 | — | — | — | — |
| | TMP | 0.5 | 0.5 | — | — | — | — |
| | NPG | — | — | — | 35 | 70 | 45 |
| | BPEO | — | — | — | 30 | — | — |
| | Total | 100 | 100 | 100 | 100 | 100 | 100 |
| Depolymerizing agent | TMA | 4.9 | 3.7 | 3.7 | — | 2.7 | — |
| | IPA | — | — | — | 5 | — | 3.5 |
| Number average molecular mass | | 8,800 | 10,800 | 9,000 | 6,500 | 7,000 | 6,000 |
| Acid value (mg KOH/g) | | 25.0 | 29.4 | 17.6 | 18.0 | 17.6 | 17.4 |
| Melting point (° C.) | | 81.0 | 91.2 | 81.8 | — | — | — |
| Crystal-melting calorie (J/g) | | 89.1 | 63.0 | 92.1 | — | — | — |
| Crystallization temperature during temperature decrease (° C.) | | 53.0 | 33.2 | 55.9 | — | — | — |

The abbreviations shown in Table 4 have the following meanings:

DDA: dodecanediotic acid
SEA: sebacic acid
SUA: succinic acid
TPA: terephthalic acid
IPA: isophthalic acid
ADA: adipic acid
EG: ethylene glycol
BD: 1,4-butanediol
TMP: trimethylol propane
NPG: neopentyl glycol
BPEO: bisphenol A ethyleneoxide adduct
TMA: trimellitic acid

Production Example 1

Preparation of Self-Dispersible Water-Based Polyester Resin Emulsion (S-1)

First, 200 g of the [crystalline polyester resin P-1] and 467 g of methylethyl ketone were placed into a 3-liter capacity 3-neck round-bottom flask, which was submerged into a hot-water bath kept at 60° C. and dissolved by using an agitator until the resultant became a transparent solution. While the solution was kept heated and agitated, 27 g of triethylamine was added as a basic compound thereto, and 653 g of distilled water was then added gradually, with attention paid to a homogenous system, to subject the resultant to phase inversion and emulsification. Then, the flask was transferred to an oil bath at 85° C., to which a cooling tube was attached, and methylethyl ketone was boiled together with water, with agitation for distillation. Depending on a distillation state, the hot-water bath was heated and finally up to 120° C. The heating was stopped at the time when the mass of a distilled solution reached to a weight of 680.3 g, and the system was cooled to room temperature in a water bath. Then, 2.6 g of ammonia water (28% by mass) was added and agitated, and liquid components inside the flask were filtered by using a 600-mesh filter to prepare a [self-dispersible water-based polyester resin emulsion (S-1)].

Production Example 2

Preparation of Self-Dispersible Water-Based Polyester Resin Emulsion (S-2)

A [self-dispersible water-based polyester resin emulsion (S-2)] was prepared similarly as with Production Example 1 except that the [crystalline polyester resin P-2] was used in place of the [crystalline polyester resin P-1] in Production Example 1, triethylamine was used in a quantity of 33 g, and ammonia water (28% by mass) to be added at the final stage was used in a quantity of 0.9 g.

Production Example 3

Preparation of Self-Dispersible Water-Based Polyester Resin Emulsion (S-3)

A [self-dispersible water-based polyester resin emulsion (S-3)] was prepared similarly as with Production Example 1 except that [crystalline polyester resin P-3] was used in place of [crystalline polyester resin P-1], 15 g of ammonia water (28% by mass) was used in place of 27 g of trethylamine, and 0.9 g of ammonia water (28% by mass) to be added at the final stage was used in place of 2.6 g of the ammonia water in Production Example 1.

Production Example 4

Preparation of Self-Dispersible Water-Based Polyester Resin Emulsion (S-4)

First, 558.4 g of water, 135.0 g of isopropyl alcohol, 300 g of the [amorphous polyester resin P-4] and 6.4 g of ammonia water (28% by mass) were placed into a 3-liter capacity 3-neck round-bottom flask, which was submerged into a hot-water bath and heated to an internal temperature of 70° C., with agitation. One hour later, 113.6 g of water was added to the system, with heating and agitation kept. Then, a cooling tube was attached to the flask, the hot-water bath was heated to 85° C., and isopropyl alcohol was boiled together with water for distillation. Depending on the distillation state, an oil bath was heated and finally up to 120° C. The heating was stopped at the time when the mass of the distilled solution reached 256.5 g, and the system was cooled to room temperature in a water bath. Then, liquid components inside the flask were filtered by using a 600-mesh filter to prepare a [self-dispersible water-based polyester resin emulsion (S-4)], with the solid content concentration of 30.0% by mass.

Production Example 5

Preparation of Self-Dispersible Water-Based Polyester Resin Emulsion (S-5)

A [self-dispersible water-based polyester resin emulsion (S-5)], with the solid content concentration of 30.0% by mass, was prepared similarly as with Production Example 4 except that [amorphous polyester resin P-5] was used in place of the [amorphous polyester resin P-4] in Production Example 4.

Production Example 6

Preparation of Self-Dispersible Water-Based Polyester Resin Emulsion (S-6)

The [self-dispersible water-based polyester resin emulsion (S-6)], with the solid content concentration of 30.0% by mass, was prepared similarly as with Production Example 4 except that [amorphous polyester resin P-6] was used in place of the [amorphous polyester resin P-4] in Production Example 4.

Table 5 shows characteristics of each of the thus obtained polyester resin aqueous dispersions [self-dispersible water-based polyester resin emulsions (S-1 to S-6)].

TABLE 5

| | Polyester resin aqueous dispersion | | | | | |
|---|---|---|---|---|---|---|
| | S-1 | S-2 | S-3 | S-4 | S-5 | S-6 |
| Polyester resin | P-1 | P-2 | P-3 | P-4 | P-5 | P-6 |
| Solid content of polyester resin (% by mass) | 30.0 | 29.7 | 30.0 | 30.0 | 30.0 | 30.0 |
| Dispersion state | Stable | Stable | Stable | Stable | Stable | Stable |

Example 1

Preparation of Image Receiving Sheet for Electrophotography

—Preparation of Titanium Dioxide Dispersion—

The following components were mixed and dispersed by using a disperser (NBK-2, Nissei Corporation) to prepare titanium dioxide dispersion.

Titanium dioxide (R-780-2, Ishihara Sangyo Kaisha Ltd.): 48 parts by mass

Polyvinyl alcohol (PVA 205C, Kuraray Co., Ltd.): 40 parts by mass

Surfactant (DEMOL EP, Kao Corporation): 0.6 parts by mass

Ion exchanged water: 31.6 parts by mass

Then, on the support A, a toner image receiving layer having the following formulation by a wire coater, was dried at 90° C. for 2 minutes to form a toner image receiving layer with a dry mass of 8 g/$m^2$. As described above, prepared was the image receiving sheet for electrophotography given in Example 1.

—Composition for Toner Image Receiving Layer—

Self-dispersible water-based polyester resin emulsion (S-1): 10 parts by mass

Self-dispersible water-based polyester resin emulsion (S-5): 90 parts by mass

Water: 128.7 parts by mass

Above titanium dioxide dispersion: 15.5 parts by mass

Carnauba wax aqueous dispersion (SEROSOL 524, Chukyo Yushi Co., Ltd.): 10 parts by mass Polyethylene oxide (ALKOX R1000, Meisei Chemical Works, Ltd.): 4.8 parts by mass Anionic surfactant (RAPISOL A90, NOF Corporation): 1.5 parts by mass Example 2

Preparation of Image Receiving Sheet for Electrophotography

The image receiving sheet for electrophotography in Example 2 was prepared as in Example 1 except that the following was used in place of the self-dispersible water-based polyester resin emulsion in Example 1.

Self-dispersible water-based polyester resin emulsion (S-1): 5 parts by mass

Self-dispersible water-based polyester resin emulsion (S-5): 95 parts by mass

Example 3

Preparation of Image Receiving Sheet for Electrophotography

The image receiving sheet for electrophotography in Example 3 was prepared as in Example 1 except that the following was used in place of the self-dispersible water-based polyester resin emulsion in Example 1.

Self-dispersible water-based polyester resin emulsion (S-2): 5 parts by mass

Self-dispersible water-based polyester resin emulsion (S-6): 95 parts by mass

Example 4

Preparation of Image Receiving Sheet for Electrophotography

The image receiving sheet for electrophotography in Example 4 was prepared as in Example 1 except that the following was used in place of the self-dispersible water-based polyester resin emulsion in Example 1.

Self-dispersible water-based polyester resin emulsion (S-3): 5 parts by mass

Self-dispersible water-based polyester resin emulsion (S-5): 95 parts by mass

Example 5

Preparation of Image Receiving Sheet for Electrophotography

The image receiving sheet for electrophotography in Example 5 was prepared as in Example 1 except that a coating solution for intermediate layer having the following formulation was coated on a support and dried to form an intermediate layer with a thickness at 5 μm after drying, thereby forming a toner image receiving layer on the intermediate layer in Example 1.

—Preparation of Coating Solution for Intermediate Layer—

The following components were mixed and agitated to prepare a coating solution for intermediate layer.

Water soluble acryl resin: 100 parts by mass ([HIROS X-XE240]; manufactured by Seiko PMC Corporation, glass transition temperature (Tg), 15° C.; acid value, 82 mg KOH/g; solid content, 42% by mass; ammonia content, 0.98%)

Water soluble acryl resin: 100 parts by mass (PDX 7325: Johnson Polymer Inc, glass transition temperature (Tg), 66° C.; acid value, 61 mg KOH/g; solid content, 45% by mass; ammonia content, 0.77%)

Polyethylene oxide: 2.5 parts by mass ([ALKOX R1000]: Meisei Chemical Works, Ltd.)

Anionic surfactant: 1.2 parts by mass ([RAPISOL A90]: NOF Corporation)

Ion exchanged water: 60 parts by mass

Comparative Example 1

The image receiving sheet for electrophotography in Comparative Example 1 was prepared as in Example 1, except that the following was used in place of the self-dispersible water-based polyester resin emulsion in Example 1.

Self-dispersible water-based polyester resin emulsion (S-4): 100 parts by mass

Comparative Example 2

Preparation of Image Receiving Sheet for Electrophotography

The image receiving sheet for electrophotography in Comparative Example 2 was prepared as in Example 1, except that the following was used in place of the self-dispersible water-based polyester resin emulsion in Example 1.

Self-dispersible water-based polyester resin emulsion (S-1): 100 parts by mass

Comparative Example 3

Preparation of Image Receiving Sheet for Electrophotography

The image receiving sheet for electrophotography in Comparative Example 3 was prepared as in Example 1, except that the following was used in place of the self-dispersible water-based polyester resin emulsion in Example 1.

Self-dispersible water-based polyester resin emulsion (S-1): 25 parts by mass

Self-dispersible water-based polyester resin emulsion (S-4): 75 parts by mass

Comparative Example 4

Preparation of Image Receiving Sheet for Electrophotography

The image receiving sheet for electrophotography in Comparative Example 4 was prepared as in Example 1, except that the following was used in place of the self-dispersible water-based polyester resin emulsion in Example 1.

Self-dispersible water-based polyester resin emulsion (S-1): 50 parts by mass

Self-dispersible water-based polyester resin emulsion (S-4): 50 parts by mass

Then, regarding each of the thus obtained image receiving sheets for electrophotography, the toner image receiving layer was measured for viscoelasticity in the following manner. Table 7 shows the results. Further, each of the image receiving sheets for electrophotography was used to form an image, by which adhesion resistance, image defects (edge void, blister) and gloss properties were evaluated in the following manner. Table 8 shows the results.

<Measurement of Viscoelasticity>

A storage elastic modulus G' at 100° C. during the course of a temperature increase and a storage elastic modulus G' at 60° C. during the course of a temperature decrease on the toner image receiving layer of each of the image receiving sheets for electrophotography in Examples 1 to 5 and Comparative Examples 1 to 4 as well as a temperature difference ΔT (° C.) between a temperature at which the storage elastic modulus G' during the course of a temperature increase reaches $1\times10^5$ Pa and a temperature at which storage elastic modulus G' during the course of a temperature decrease reaches $1\times10^5$ Pa were obtained based on temperatures and viscoelasticities by measuring by use of a rheometer (VAR-100, manufactured by Rheologica Inc.) having a plate-to-plate distance (GAP) of 1.5 mm and a diameter of 20 mm at temperatures from 50° C. to 200° C. during the course of a temperature increase at 5°

C./min and also at temperatures from 200° C. to 40° C. during the course of a temperature decrease at 5° C./min.

<Image-Forming Conditions>

—Image Formation—

Each of the thus prepared image receiving sheets for electrophotography was treated by using an image forming apparatus (Docu Centre Color 500CP, manufactured by Fuji Xerox Co., Ltd.) shown in FIG. 4, and the fixing portions were treated by using an image forming apparatus modified into the image surface smoothing and fixing device shown in FIG. 5 to picturize an image at 23° C. and at RH of 55% under the following conditions and form the image. Thereafter, the image was fixed, with the image face kept upward.

—Belt—

Support of belt: Polyimide (PI) film 50 cm in width and 80 μm in thickness

Material of belt mold releasing layer: SIFEL 610 (manufactured by Shin-Etsu Chemical Co., Ltd.), or a precursor of fluorocarbon siloxane rubber, was vulcanized and cured to form a 50 μm-thick fluorocarbon siloxane rubber layer.

—Heating and Pressurizing Step—

Temperatures on heating roller: variable, 120° C., 125° C. or 135° C.

Nip pressure: 130N/$cm^2$

—Cooling Step—

Cooler: length of heat sinks, 80 mm

Speed: 20 mm/sec.

<Evaluation of Adhesion Resistance>

After 24-hour storage at 40° C. and 80% RH, the toner image receiving layer surface on each of image receiving sheets for electrophotography was superimposed with the back surface on each of the image receiving sheets for electrophotography in opposition to each other and a load of 3.5 cm square×500 g was applied thereto. After being allowed to stand for 3 days under the same conditions, the image receiving sheets for electrophotography were peeled off and evaluated for the peeled state by referring to the following criteria. It is noted that the criteria of ○ or higher are desirable in the present invention.

[Criteria]

A: Neither peeling sound nor adhesion mark is found on peeling.

B: Slight peeling sound or adhesion mark is found on peeling.

C: Adhesion mark remains by less than ¼.

D: Adhesion mark remains by ¼ or more and less than ½ on peeling.

E: Adhesion mark remains by ½ or more on peeling.

<Evaluation of Low Temperature Fixing Property (Edge Void)>

Above-described fixing-portion modified image forming apparatus (DocuCentre Color 500CP) was used to output black x marks (a longitudinal image consisting of 5 x marks in 1.8 cm square) and red x marks (a longitudinal image consisting of 5 x marks in 1.8 cm square) respectively left above and right below on A4-size paper. Thereafter, the images were fixed by an image surface smoothing and fixing device, with the temperature of the heating roller set at 120° C. The degree of defects occurring on the border line between a toner image portion and a non-image portion of printed samples after fixation were visually evaluated (dents at an edge portion: edge void (EV)) according to the following criteria. Values evaluated for the red and black marks given left above and right below were averaged. It is noted that the criteria of "C" or higher (2 or less) are desirable for practical use in the present invention.

[Criteria]

0 (A): No visual dents are found.

1 (B): Dents are found in half of the x marks in spots.

2 (C): Dents are found in all the x marks in spots.

3 (D to C): Dents are found in all the x marks, with a length up to approximately 2 mm 4 (D): Dents are found in all the x marks, with a length up to approximately 5 mm.

<Evaluation of Image Defects (Blister)>

Above-described fixing-portion modified image forming apparatus (DocuCentre Color 500CP) was used to picturize black images formed uniformly in a size of 10 cm×10 cm at a maximum concentration on A4-size paper, and the temperature of a heating roller was set at 135° C. to fix the images. Thereafter, the degree of white dotted defects on a toner black image portion was visually evaluated according to the following criteria. It is noted that the criteria of "B" or higher are desirable for practical use in the present invention.

[Criteria]

A: White dotted defects are not found at all at the toner black image portion.

B: White dotted defects are found slightly at the toner black image portion.

C: Countless number of dotted defects are found all over the toner black image portion.

<Evaluation of Image Quality (Gloss Property)>

Above-described fixing-portion modified image forming apparatus (DocuCentre Color 500CP) was used to output black images (1.8 cm square) at six concentration levels (0%, 20%, 40%, 60%, 80% and 100%) under black/white conditions on each of the image receiving sheets for electrophotography. Thereafter, the images were fixed by using an image surface smoothing and fixing device, with the temperature of a heating roller set at 125° C. The thus respective obtained images at six concentration levels were measured for the gloss level at 20 degrees by using a micro-TR1-gloss (manufactured by BYK Gardner GmbH) to obtain minimum values, which were evaluated by referring to the following criteria.

[Criteria]

Gloss level of 75 or more; excellent,

Gloss level of 70 or more: good,

Gloss level of 60 or more: passable, and

Gloss level of less than 60: poor

TABLE 6

| | Toner image receiving layer | | | | | |
|---|---|---|---|---|---|---|
| | | Melting point of | | Melting point of | Mixed mass ratio (% by mass) | |
| | Crystalline polyester | crystalline polyester | Amorphous polyester | amorphous polyester | Crystalline polyester | Amorphous polyester |
| Ex. 1 | S-1 | 82.1° C. | S-5 | 41° C. | 10 | 90 |
| Ex. 2 | S-1 | 82.1° C. | S-5 | 41° C. | 5 | 95 |

TABLE 6-continued

| | Toner image receiving layer | | | | | |
|---|---|---|---|---|---|---|
| | | Melting point of | | Melting point of | Mixed mass ratio (% by mass) | |
| | Crystalline polyester | crystalline polyester | Amorphous polyester | amorphous polyester | Crystalline polyester | Amorphous polyester |
| Ex. 3 | S-2 | 91.2° C. | S-6 | 60° C. | 5 | 95 |
| Ex. 4 | S-3 | 84.5° C. | S-5 | 41° C. | 5 | 95 |
| Ex. 5 | S-1 | 82.1° C. | S-5 | 41° C. | 10 | 90 |
| Compara. Ex. 1 | not used | — | S-4 | 70° C. | 0 | 100 |
| Compara. Ex. 2 | S-1 | 82.1° C. | not used | — | 100 | 0 |
| Compara. Ex. 3 | S-1 | 82.1° C. | S-4 | 70° C. | 25 | 75 |
| Compara. Ex. 4 | S-1 | 82.1° C. | S-4 | 70° C. | 50 | 50 |

TABLE 7

| | G' during process of a temperature increase (100° C.) MPa | G' during process of a temperature decrease (60° C.) MPa | Temperature difference ΔT (hysteresis) ° C. |
|---|---|---|---|
| Ex. 1 | $6.36 \times 10^3$ | $1.12 \times 10^6$ | 11.1 |
| Ex. 2 | $2.90 \times 10^4$ | $2.52 \times 10^6$ | 10.4 |
| Ex. 3 | $9.64 \times 10^4$ | $5.12 \times 10^6$ | 18.0 |
| Ex. 4 | $5.13 \times 10^4$ | $3.02 \times 10^6$ | 9.8 |
| Ex. 5 | $6.36 \times 10^3$ | $1.12 \times 10^6$ | 11.1 |
| Compara. Ex. 1 | $1.72 \times 10^5$ | $4.03 \times 10^6$ | 6.6 |
| Compara. Ex. 2 | $2.26 \times 10^0$ | $9.26 \times 10^5$ | 23.0 |
| Compara. Ex. 3 | $9.79 \times 10^2$ | $8.32 \times 10^4$ | 16.5 |
| Compara. Ex. 4 | $1.77 \times 10^1$ | $3.23 \times 10^3$ | 23.7 |

* ΔT: A temperature difference ΔT (hysteresis) between a temperature at which the storage elastic modulus G' during the course of a temperature increase at 5° C./min reaches $1 \times 10^5$ Pa and a temperature at which the storage elastic modules G' during the course of a temperature decrease at 5° C./min reaches $1 \times 10^5$ Pa

TABLE 8

| | Fixing-device passing performance (at 150° C.) | Toner fixing property (EV at 120° C.) | Adhesion resistance | Gloss property Gloss at 20 degrees |
|---|---|---|---|---|
| Example 1 | A | C | A | Excellent |
| Example 2 | A | C | A | Excellent |
| Example 3 | A | B to A | B | Good |
| Example 4 | A | B to A | B | Excellent |
| Example 5 | A | C | A | Excellent |
| Comparative Example 1 | A | D | B | Excellent |
| Comparative Example 2 | C | A | A | Poor |
| Comparative Example 3 | A | A | A | Good |
| Comparative Example 4 | A | B | A | Poor |

The image recording material of the present invention exerts favorable low temperature toner fixing property and excellent adhesion resistance, is capable to form a highly glossy and high-quality image which is excellent in peeling property from a fixing device, and is preferably applicable for image receiving sheets for electrophotography, thermosensitive recording sheets, sublimation transfer recording sheets, thermal transfer recording sheets, sheets for silver halide photography and inkjet recording sheets.

The method for producing an image recording material of the present invention is preferably used in producing the image recording material of the present invention.

The image forming method of the present invention can be preferably used in forming an image by using an image receiving sheet for electrophotography that can exert favorable fixing-device passing performance and can form a highly glossy and high-quality image and is one type of image recording materials of the present invention.

What is claimed is:

1. An image recording material, comprising:

a support and an image recording layer containing a crystalline self-dispersible polyester resin and an amorphous self-dispersible polyester resin on at least one surface of the support, wherein the crystalline self-dispersible polyester resin has a melting point of from 80° C. to 110° C., the amorphous self-dispersible polyester resin has a glass transition temperature of from 30° C. to 120° C., and the image recording layer, upon heating to a temperature above 100° C. at a rate of 5° C./min and then cooling at a rate of 5° C./min to a temperature of 60° C. in a continuous manner, has:

a storage elastic modulus G'(A), which is the storage elastic modulus G' on the course of a temperature increase at 5° C./min, of $1\times10^2$ Pa to $1\times10^5$ Pa at 100° C., a storage elastic modulus G'(B), which is the storage elastic modulus G' on the course of a temperature decrease at 5° C./min, of $1\times10^6$ Pa or more at 60° C. and a temperature difference of 18° C. or less between a temperature at which the storage elastic modulus G'(A) reaches $1\times10^5$ Pa and a temperature at which the storage elastic modulus G'(B) reaches $1\times10^5$ Pa, upon measurement of viscoelasticity by using a rheometer having a plate-to-plate distance of 1.5 mm and a diameter of 20 mm.

2. The image recording material according to claim 1, wherein the mixed mass ratio of the crystalline self-dispersible polyester resin to the amorphous self-dispersible polyester resin (crystalline self-dispersible polyester resin:amorphous self-dispersible polyester resin) is 1:99 to 25:75.

3. The image recording material according to claim 1, wherein the crystalline self-dispersible polyester resin and the amorphous self-dispersible polyester resin are water dispersible.

4. The image recording material according to claim 1, wherein the crystalline self-dispersible polyester resin and the amorphous self-dispersible polyester resin are carboxyl group-containing self-dispersible polyester resins.

5. The image recording material according to claim 4, wherein the carboxyl group-containing crystalline self-dispersible polyester resin contains 50 mol % or less of a polyvalent carboxylic acid component having an aromatic ring as an acid derived component with respect to the total content of all the acid derived components.

6. The image recording material according to claim 1, wherein the support has a raw paper and at least one layer of polyolefin resin layer on both surfaces of the raw paper.

7. The image recording material according to claim 1, further comprising an intermediate layer which contains a polymer for intermediate layer having a glass transition temperature (Tg) equal to or lower than an image fixing temperature between the image recording layer and the support.

8. The image recording material according to claim 1, being an image receiving sheet for electrophotography having the support and at least a single layer of toner image receiving layer on the support.

* * * * *